(12) United States Patent
Du et al.

(10) Patent No.: US 11,630,854 B2
(45) Date of Patent: *Apr. 18, 2023

(54) SEGMENTING USERS WITH SPARSE DATA UTILIZING HASH PARTITIONS

(71) Applicant: Adobe Inc., San Jose, CA (US)

(72) Inventors: Fan Du, Santa Clara, CA (US); Yeuk-Yin Chan, New York, NY (US); Eunyee Koh, San Jose, CA (US); Ryan Rossi, Mountain View, CA (US); Margarita Savova, Jersey City, NJ (US); Charles Menguy, New York, NY (US); Anup Rao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,328

(22) Filed: Apr. 22, 2022

(65) Prior Publication Data
US 2022/0253463 A1 Aug. 11, 2022

Related U.S. Application Data

(63) Continuation of application No. 16/852,110, filed on Apr. 17, 2020, now Pat. No. 11,328,002.

(51) Int. Cl.
G06F 16/00 (2019.01)
G06F 16/28 (2019.01)
(Continued)

(52) U.S. Cl.
CPC .......... *G06F 16/285* (2019.01); *G06F 16/152* (2019.01); *G06F 16/2255* (2019.01);
(Continued)

(58) Field of Classification Search
CPC ............... G06F 16/152; G06F 16/2255; G06F 16/2462; G06F 16/285; G06F 16/86; G06F 16/9014; G06F 16/906; G06F 16/909
See application file for complete search history.

(56) References Cited

U.S. PATENT DOCUMENTS

| 7,412,429 B1 * | 8/2008 | Syeda-Mahmood .. G06N 20/00 706/45 |
| 2015/0169570 A1 * | 6/2015 | Shim ................... G06F 16/2255 707/747 |

(Continued)

FOREIGN PATENT DOCUMENTS

| CN | 104933156 A | 9/2015 |
| CN | 110502704 A | 11/2019 |

OTHER PUBLICATIONS

Domenica Arlia and Massimo Coppola. 2001. Experiments in parallel clustering with DBSCAN. In European Conference on Parallel Processing. Springer, 326-331.

(Continued)

*Primary Examiner* — Diedra McQuitery
(74) *Attorney, Agent, or Firm* — Keller Preece PLLC

(57) ABSTRACT

The present disclosure describes systems, non-transitory computer-readable media, and methods for utilizing hash partitions to determine local densities and distances among users (or among other represented data points) for clustering sparse data into segments. For instance, the disclosed systems can generate hash signatures for users in a sparse dataset and can map users to hash partitions based on the hash signatures. The disclosed systems can further determine local densities and separation distances for particular users (or other represented data points) within the hash partitions. Upon determining local densities and separation distances for datapoints from the dataset, the disclosed (Continued)

systems can select a segment (or cluster of data points) grouped according to a hierarchy of a clustering algorithm, such as a density-peaks-clustering algorithm.

20 Claims, 19 Drawing Sheets

(51) Int. Cl.
G06F 16/22 (2019.01)
G06F 16/14 (2019.01)
G06F 16/84 (2019.01)
G06F 16/2458 (2019.01)
G06F 16/909 (2019.01)

(52) U.S. Cl.
CPC .......... *G06F 16/2462* (2019.01); *G06F 16/86* (2019.01); *G06F 16/909* (2019.01)

(56) References Cited

U.S. PATENT DOCUMENTS

| | | | | |
|---|---|---|---|---|
| 2016/0371362 | A1* | 12/2016 | Jadhav | G06F 16/285 |
| 2017/0147575 | A1 | 5/2017 | Pappu et al. | |
| 2019/0286739 | A1* | 9/2019 | Modarresi | G06F 16/2465 |
| 2019/0325531 | A1 | 10/2019 | Walker et al. | |
| 2020/0349245 | A1 | 11/2020 | Shila et al. | |
| 2020/0372304 | A1* | 11/2020 | Kenthapadi | G06F 16/285 |
| 2021/0125233 | A1 | 4/2021 | Adibi | |

OTHER PUBLICATIONS

SatyaJaswanth Badri. 2019. A novel Map-Scan-Reduce based density peaks clustering and privacy protection approach for large datasets. International Journal of Computers and Applications (2019), 1-11.

Roberto J Bayardo, Yiming Ma, and Ramakrishnan Srikant. 2007. Scaling up all pairs similarity search. In Proceedings of the 16th international conference on World Wide Web. ACM, 131-140.

Pavel Berkhin. 2006. A survey of clustering data mining techniques. In Grouping multidimensional data. Springer, 25-71.

Rongfang Bie, Rashid Mehmood, Shanshan Ruan, Yunchuan Sun, and Hussain Dawood. 2016. Adaptive fuzzy clustering by fast search and find of density peaks. Personal and Ubiquitous Computing 20, 5 (2016), 785-793.

Christian Böhm, Robert Noll, Claudia Plant, and Bianca Wackersreuther. 2009. Density-based clustering using graphics processors. In Proceedings of the 18th ACM conference on Information and knowledge management. ACM, 661-670.

Marco Cavallo and Çağatay Demiralp. 2018. Clustrophile 2: guided visual clustering analysis. IEEE transactions on visualization and computer graphics 25, 1 (2018), 267-276.

Ondrej Chum, James Philbin, Andrew Zisserman, et al. 2008. Near duplicate image detection: min-hash and tf-idf weighting. In Bmvc, vol. 810. 812-815.

Dong Deng, Guoliang Li, He Wen, and Jianhua Feng. 2015. An efficient partition based method for exact set similarity joins. Proceedings of the VLDB Endowment 9, 4 (2015), 360-371.

Peter Deuflhard and Andreas Hohmann. 2003. Numerical analysis in modern scientific computing: an introduction. Springer.

Inderjit S Dhillon and Dharmendra S Modha. 2002. A dataclustering algorithm on distributed memory multiprocessors. In Large-scale parallel data mining. Springer, 245-260.

Fan Du, Catherine Plaisant, Neil Spring, and Ben Shneiderman. 2018. Visual interfaces for recommendation systems: Finding similar and dissimilar peers. ACM Transactions on Intelligent Systems and Technology (TIST) 10, 1 (2018), 9.

D Foti, D Lipari, Clara Pizzuti, and Domenico Talia. 2000.Scalable parallel clustering for data mining on multicomputers. In International Parallel and Distributed Processing Symposium. Springer, 390-398.

Aristides Gionis, Piotr Indyk, Rajeev Motwani, et al. 1999. Similarity search in high dimensions via hashing. In Vldb, vol. 99. 518-529.

Michael Greenwald, Sanjeev Khanna, et al. 2001. Space-efficient online computation of quantile summaries. ACM SIGMOD Record 30, 2 (2001), 58-66.

Jeffrey Heer and Maneesh Agrawala. 2008. Design considerations for collaborative visual analytics. Information visualization 7, 1 (2008), 49-62.

James Hendler. 1992. Artificial intelligence planning systems: proceedings of the first international conference, Jun. 15-17, 1992, College Park, Maryland. Morgan Kaufmann.

Dong Hyun Jeong, Caroline Ziemkiewicz, Brian Fisher, William Ribarsky, and Remco Chang. 2009. iPCA: An Interactive System for PCA-based Visual Analytics. In Computer Graphics Forum, vol. 28. Wiley Online Library, 767-774.

Daniel Keim, Gennady Andrienko, Jean-Daniel Fekete, Carsten Görg, Jörn Kohlhammer, and Guy Melançon. 2008. Visual analytics: Definition, process, and challenges. In Information visualization. Springer, 154-175.

Daniel A Keim, Florian Mansmann, Jörn Schneidewind, Jim Thomas, and Hartmut Ziegler. 2008. Visual analytics: Scope and challenges. In Visual data mining. Springer, 76-90.

Bum Chul Kwon, Ben Eysenbach, Janu Verma, Kenney Ng, Christopher De Filippi, Walter F Stewart, and Adam Perer. 2017. Clustervision: Visual supervision of unsupervised clustering. IEEE transactions on visualization and computer graphics 24, 1 (2017), 142-151.

Hanseung Lee, Jaeyeon Kihm, Jaegul Choo, John Stasko, and Haesun Park. 2012. iVisClustering: An interactive visual document clustering via topic modeling. In Computer graphics forum, vol. 31. Wiley Online Library, 1155-1164.

Zhicheng Liu and Jeffrey Heer. 2014. The effects of interactive latency on exploratory visual analysis. IEEE transactions on visualization and computer graphics 20, 12 (2014), 2122-2131.

Stuart Lloyd. 1982. Least squares quantization in PCM. IEEE Transactions on Information Theory 28, 2 (1982), 129-137.

Rashid Mehmood, Saeed El-Ashram, Rongfang Bie, Hussain Dawood, and Anton Kos. 2017. Clustering by fast search and merge of local density peaks for gene expression microarray data. Scientific reports 7 (2017), 45602.

Rashid Mehmood, Guangzhi Zhang, Rongfang Bie, Hassan Dawood, and Haseeb Ahmad. 2016. Clustering by fast search and find of density peaks via heat diffusion. Neurocomputing 208 (2016), 210-217.

Tamara Munzner. 2009. A nested process model for visualization design and validation. IEEE Transactions on Visualization and Computer Graphics 6 (2009), 921-928.

Dan Pelleg, Andrew W Moore, et al. 2000. X-means: Extending k-means with efficient estimation of the number of clusters.. In ICML, vol. 1. 727-734.

Anand Rajaraman and Jeffrey David Ullman. 2011. Chapter 3, Mining of massive datasets. Cambridge University Press.

William M Rand. 1971. Objective criteria for the evaluation of clustering methods. Journal of the American Statistical association 66, 336 (1971), 846-850.

Chandan K Reddy and Bhanukiran Vinzamuri. 2018. A survey of partitional and hierarchical clustering algorithms. In Data Clustering. Chapman and Hall/CRC, 87-110.

Alex Rodriguez and Alessandro Laio. 2014. Clustering by fast search and find of density peaks. Science 344, 6191 (2014), 1492-1496.

Tobias Schreck, Jürgen Bernard, Tatiana Von Landesberger, and Jörn Kohlhammer. 2009. Visual cluster analysis of trajectory data with interactive kohonen maps. Information Visualization 8, 1 (2009), 14-29.

Yong Shi, Zhensong Chen, Zhiquan Qi, Fan Meng, and Limeng Cui. 2017. A novel clustering-based image segmentation via density peaks algorithm with mid-level feature. Neural Computing and Applications 28, 1 (2017), 29-39.

Anshumali Shrivastava and Ping Li. 2014. In defense of minhash over simhash. In Artificial Intelligence and Statistics. 886-894.

(56) References Cited

OTHER PUBLICATIONS

Rares Vernica, Michael J Carey, and Chen Li. 2010. Efficient parallel set-similarity joins using MapReduce. In Proceedings of the 2010 ACM SIGMOD International Conference on Management of data. ACM, 495-506.

Joe H Ward Jr. 1963. Hierarchical grouping to optimize an objective function. J. Amer. Statist. Assoc. 58, 301 (1963), 236-244.

John Wenskovitch, Ian Crandell, Naren Ramakrishnan, Leanna House, and Chris 1439 North. 2017. Towards a systematic combination of dimension reduction and 1440 clustering in visual analytics. IEEE transactions on visualization and computer 1441 graphics 24, 1 (2017), 131-141.

Hong Zhao, Tao Wang, and Xiangyan Zeng. 2018. A clustering algorithm for key frame extraction based on density peak. Journal of Computer and Communications 6, 12 (2018), 118-128.

Weizhong Zhao, Huifang Ma, and Qing He. 2009. Parallel k-means clustering based on mapreduce. In IEEE International Conference on Cloud Computing. Springer, 674-679.

U.S. Appl. No. 16/852,110, dated Jan. 4, 2022, Notice of Allowance.

\* cited by examiner

SEGMENTING USERS WITH SPARSE DATA UTILIZING HASH PARTITIONS

CROSS-REFERENCE TO RELATED APPLICATIONS

This application is a continuation of U.S. patent application Ser. No. 16/852,110, filed on Apr. 17, 2020. The aforementioned application is hereby incorporated by reference in its entirety.

BACKGROUND

In recent years, conventional-data-clustering systems have significantly improved segmenting datasets. For example, conventional-data-clustering systems can determine clusters for large datasets comprising dense or rich detail on characteristics of website visitors. To illustrate, conventional-data-clustering systems can cluster data points by serially comparing each point in a dataset to each other point in the dataset. While such point-by-point comparison can improve the accuracy of data clusters, such conventional-data-clustering systems can cluster largest datasets only with an inefficient use of computing and limit clustering to an inflexible set of time or data applications.

As just suggested, although conventional-data-clustering systems can cluster datasets, such systems inefficiently identify such clusters in terms of computing resources and time. By comparing each data point to each other data point, for instance, conventional-data-clustering systems require inordinate time, memory, and computing resources for even moderately sized datasets. This inefficiency is compounded with larger and sparser datasets. As datasets include sparser details on individual website visitors, application users, or other entities, some conventional-data-clustering systems perform more complex processing to compare data points. The time and computing resources consumed by such complex processing makes conventional data clustering impracticable to perform in real time (or near-real time) for large and sparse datasets. The pairwise approach of conventional-data-clustering systems accordingly lacks efficiency, wasting time and computing resources in processing data.

In addition to such inefficiencies, conventional-data-clustering systems lack flexibility—by failing to adjust clusters in real time (or near-real time) or to changes in datasets. The pairwise processing of conventional-data-clustering systems is infeasible in many contexts. Indeed, the requirements of are so high that any change to parameters or to the dataset itself requires lengthy and costly reprocessing. Such costly reprocessing makes any real-time application impractical or impossible for conventional-data-clustering systems, severely limiting the use of conventional-data-clustering systems. Such reprocessing also prevents conventional-data-clustering systems from responding to changes in a dataset or modifying clustering parameters after initially clustering the dataset. Accordingly, conventional-data-clustering systems lack flexibility and lack utility in a variety of data contexts.

SUMMARY

This disclosure describes embodiments of systems, non-transitory computer-readable media, and methods that solve the foregoing problems in addition to providing other benefits. In particular, the disclosed systems utilize hash partitioning to determine local densities and distances among users (or among other represented data points) for clustering sparse data into segments. For instance, the disclosed systems can generate hash signatures for data points from a dataset, such as a large and sparse data matrix recording user activities. The disclosed system further maps the data points to hash partitions based on the hash signatures. The systems subsequently determine, within such hash partitions, local densities and separation distances for the data points. Upon determining local densities and separation distances for datapoints from the dataset, the system can select a segment or cluster of data points grouped according to a hierarchy of a clustering algorithm. For example, the disclosed systems can extemporaneously cluster data points from a sparse dataset into segments of users in real (or near-real) time using a density-peaks-clustering algorithm based on previously processed local densities and distances—in response to a request to segment a dataset.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
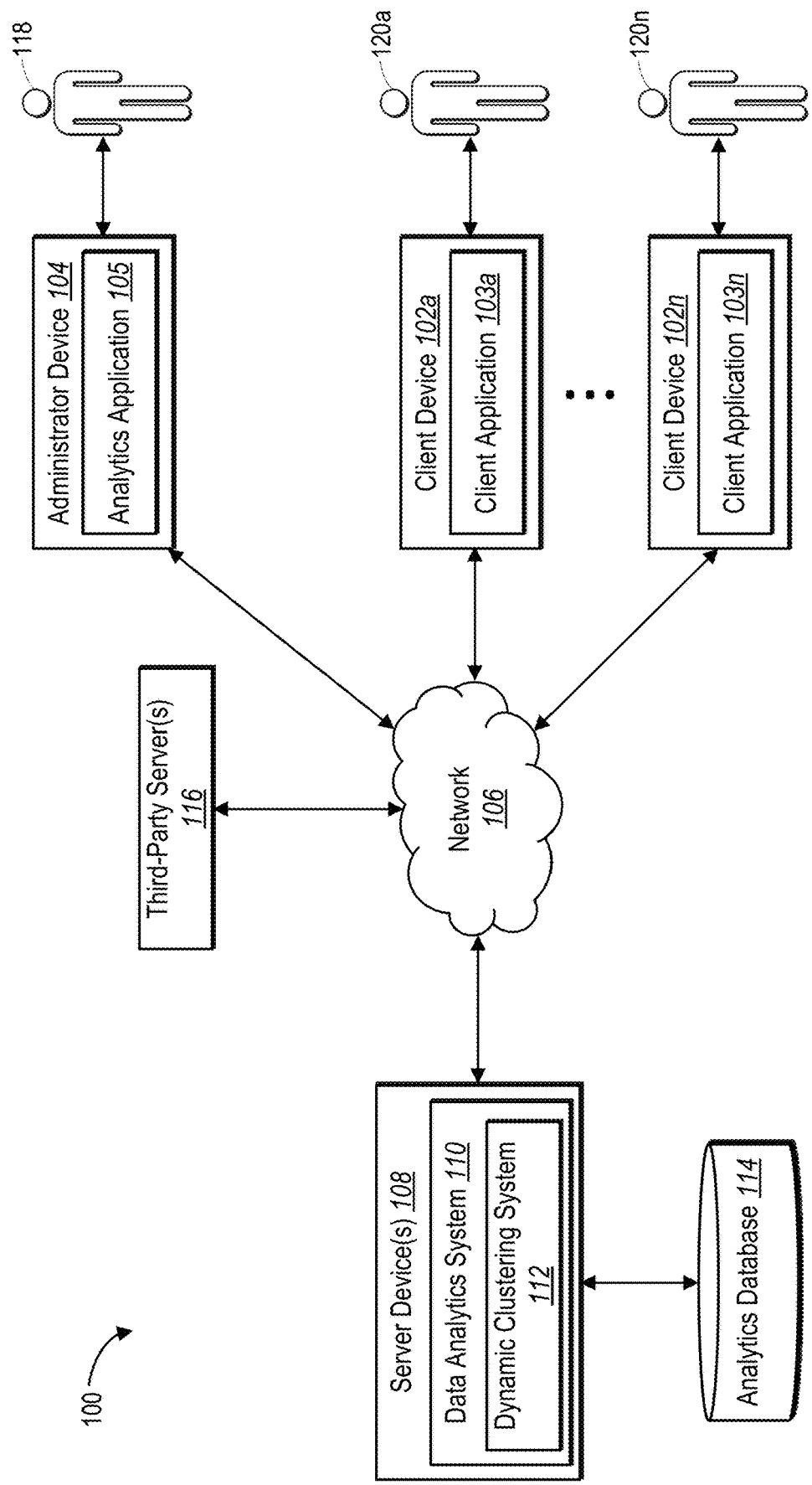
FIG. 1 illustrates a diagram of an environment in which a dynamic clustering system can operate in accordance with one or more embodiments.

This disclosure describes one or more embodiments of a dynamic clustering system that determines local densities and distances of users (or other represented data points) within hash partitions to cluster users from a dataset according to a clustering algorithm. For instance, the dynamic clustering system can utilize hash signatures approximating similarity metrics among users to map users to hash partitions. In some embodiments, the dynamic clustering system determines (i) local densities of data points neighboring particular data points within hash partitions and (ii) separation distances of particular data points from other data points within such hash partitions. The dynamic clustering system utilizes these local densities and distances as a basis for clustering subsets of data points into segments according to a density-based-clustering algorithm, such as a density-peaks-clustering algorithm. Accordingly, the dynamic clustering system can cluster users or other represented data points from a dataset in real time (or near-real time) by determining hash-partition-based local densities and separation distances during preprocessing and extemporaneously clustering data points based on such densities and distances.

As just mentioned, the dynamic clustering system can initially assign users or other represented data points to hash partitions to facilitate clustering. For instance, in one or more embodiments, the dynamic clustering system generates a hash signature including a set of hash values for each user from a dataset, such as a large and sparse dataset. In some embodiments, the dynamic clustering system generates MinHash signatures comprising MinHash values that approximate a weighted similarity for users in the dataset.

The dynamic clustering system can utilize such hash signatures to map users to hash partitions. In some embodiments, the dynamic clustering system maps the same or similar hash values to the same hash partition. Accordingly, the dynamic clustering system can identify shared hash partitions between users (or other represented data points) and utilize these identifications as indications of similarity. In one or more embodiments, the dynamic clustering system utilizes locality-sensitive hashing ("LSH") to map the users to hash partitions based on MinHash signatures.

By mapping a set of users represented by a sparse dataset or other dataset to hash partitions, the dynamic clustering system reduces the data points with which to compare in a common hash partition. To illustrate, in some embodiments, the dynamic clustering system determines, within hash partitions, local densities of users neighboring particular users from the subset of users based on shared hash partitions among the subset of users. The dynamic clustering system further determines, within such hash partitions, separation distances of nearest local users of higher density. The dynamic clustering system can subsequently use such hash-partition-based densities and distances to determine various segments of users from a sparse dataset. The dynamic clustering system can determine local densities and separation distances for queried users and/or for queried multi-dimensional data points.

To determine local density for each data point based on hash partitions, in one or more embodiments, dynamic clustering system determines the local density as a number of neighboring users within a separation-distance threshold of a queried user. Accordingly, the dynamic clustering system can determine the local density by identifying users sharing a threshold number of hash partitions with the queried user. That is, in one or more embodiments, the dynamic clustering system utilizes the shared hash partitions between users to approximate identification of users within the separation-distance threshold. To improve accuracy and remove false positives, in some cases, the dynamic clustering system excludes any identified user with an actual separation distance that fails to satisfy the separation-distance threshold from the determination of the local density.

In addition to determining local densities of such data points, the dynamic clustering system can correct for false negatives in such determinations of local density. In some embodiments, the dynamic clustering system determines a retrieval probability of retrieving a neighboring user within the separation-distance threshold from the queried user. The retrieval probability can reflect the probability that a user within the separation-distance threshold also shares a threshold number of hash partitions. The dynamic clustering system can utilize this retrieval probability to correct the determined local density. That is, the dynamic clustering system can adjust the count of users sharing the threshold number of hash partitions based on the retrieval probability.

As noted above, the dynamic clustering system can also identify a nearest local user of higher density from a queried user or other represented data point utilizing hash partitions. In one or more embodiments, the dynamic clustering system identifies each user sharing at least one hash partition with a queried user and considers those users in identifying the nearest local user of higher density. After removing from consideration any local users having lower density than the queried user, in some embodiments, the dynamic clustering system determines separation distances for each of the remaining identified users of higher density sharing a hash partition. The dynamic clustering system can accordingly identify the lowest separation distance from the remaining identified users of higher density as the nearest local user of higher density.

When identifying a nearest local user of higher density to a queried user, the dynamic clustering system can correct for false negatives among considered users. In some embodiments, the dynamic clustering system determines a non-collision probability that reflects the probability that a true nearest local user of higher density does not share at least one hash partition with the queried user. If the dynamic clustering system determines that the non-collision probability does not satisfy a probability threshold, the dynamic clustering system can determine a corrected nearest user of higher density. For example, in one or more embodiments, the dynamic clustering system selects a corrected nearest user of higher density from a high-density set of users (e.g., top 700 or top 1000 densest users in a dataset) by selecting the nearest user to the queried user from among the high-density set of users.

As discussed briefly above, the dynamic clustering system can apply a density-based-clustering algorithm to cluster data segments from a dataset based on local densities and separation distances. For example, in one or more embodiments, the dynamic clustering system determines segments of users clustered according to a hierarchy of nearest local users of higher density. By clustering according to such a hierarchy, the dynamic clustering system can assign a user to a segment grouped according to a nearest user of higher density. For instance, the dynamic clustering system utilizes can apply a density-peaks-clustering algorithm in real (or near-real time) to place a variety of users from sparse data into a variety of user segments.

The dynamic clustering system provides several technical advantages and benefits over conventional-data-clustering systems. By mapping users to hash partitions and determining hash-based densities and distances for data points, for example, the dynamic clustering system improves efficiency of generating segments of users relative to conventional-data-clustering systems. Unlike conventional-data-clustering systems, the dynamic clustering system does not need to evaluate each point relative to each other point in the dataset to determine the density and distance of such data points. Instead, the dynamic clustering system utilizes hash partitioning to intelligently and quickly determine the local density and separation distance of a queried user to facilitate real time (or near-real time) application of a clustering algorithm.

Unlike the inordinate time and resources required by conventional-data-clustering systems, the dynamic clustering system conserves computing resources and quickly and efficiently clusters sparse (and sometimes large) datasets by determining hash-partition-based densities and distances before applying a clustering algorithm. By improving the clustering speed, the dynamic clustering system continuously pre-process datasets in the background without unduly taxing computing resources. The speed further allows the dynamic clustering system to dynamically update clusters as new data points are added to the sparse dataset. As described below, in some cases, the dynamic clustering system expedites clustering up to twenty times that of conventional-data-clustering systems.

In addition to (and in part because of) improving the speed of extemporaneous clustering, the dynamic clustering system also improves the flexibility with which data-clustering systems cluster datasets. By using hash-partition-based densities and distances to cluster, in some embodiments, the dynamic clustering system both pre-processes datasets to determine density and distance and performs parallel processing to generate clusters. As suggested above, the dynamic clustering system can extemporaneously generate and split user segments and sub-segments in response to user selection within a graphical user interface. For example, the dynamic clustering system can divide and combine clusters in real time (or near-real time) based on user selections in a user interface, providing an administrator or system user data relevant to a variety of contexts and circumstances. Unlike conventional-data-clustering systems, the dynamic clustering system can cluster sparse datasets and continuously updated datasets into new data segments.

In addition to improved efficiency and flexibility, the dynamic clustering system can perform accuracy corrections to adjust for implementing hash partitions as a basis for density and distance. By grouping users into hash partitions and utilizing such hash partitions to determine density and distance, in some cases, the dynamic clustering system may fail to consider each relevant user or neighboring user of higher density. When the dynamic clustering system determines a density of a data point within hash partitions, for instance, the system may determine false positives or negatives—by falsely identifying data points to count near a queried data point or failing to identify data points to count near the queried data point. In a density calculation, such a false negative may include excluding some users that do not share enough hash partitions for consideration but are nonetheless located within the separation-distance threshold. In a distance calculation, a false positive may include failing to identify the actual nearest user of higher density.

To avoid these false results and improve accuracy for density calculations, in some embodiments, the dynamic clustering system can determine a retrieval probability of retrieving a neighboring user within the separation-distance threshold from the queried user. Based on this retrieval probability, as explained below, the dynamic clustering system can adjust the determined local density for the queried user. For instance, the dynamic clustering system can correct for false positives returned by the hash partitions in density calculations by removing users from consideration above a separation-distance threshold.

To correct for false negatives in separation distance calculations and more accurately determine the nearest user of higher density for a queried user, the dynamic clustering system can determine a non-collision probability. Such a non-collision probability reflects a probability that an actual nearest user of higher density does not share at least one hash partition with the queried user. Based on the non-collision probability, as explained below, the dynamic clustering system determines whether to identify a corrected nearest user of higher density by comparing a queried user to a high-density set of users from the larger dataset.

As illustrated by the foregoing discussion, the present disclosure utilizes a variety of terms to describe features and advantages of the dynamic clustering system. For example, as used herein, the term "sparse dataset" refers to a dataset in which a portion of attributes, behavior, characteristics, dimensions, or variables lack data or a data values. In particular, a sparse dataset can include a large dataset of digital users and values corresponding user attributes and/or user behavior and lack values for a relatively high portion of remaining dimensions for different attributes or behavior. Accordingly, many dimensions or cells for user attributes and/or user behavior may lack values in a sparse dataset. In some cases, a sparse dataset can include user identifiers, user demographic attributes, user purchases, user interactions with other users, blank data cells, and various other user attributes for large numbers of users.

Additionally, as used herein, the term "hash partition" refers to a grouping or organization of data points by assignment or according to values determined for data points. In particular, a hash partition can include a grouping of users or other represented data points having hash values corresponding to similar user attributes and/or user behavior. As described and depicted in this application, data points may be organized or assigned to a hash partition (or multiple hash partitions) without grouping the data points into a digital location. To illustrate, a hash partition can include groups generated through locality-sensitive hashing of Min-Hash signatures that approximate similarity among users. For example, the dynamic clustering system can map users to hash partitions based on hash signatures and can accordingly track collisions between users mapped to the same hash partition(s).

Further, as used herein, the term "hash signature" refers to a series of values (e.g., numbers, alphanumeric) or code generated for a user or other represented data point using a hashing function. In particular, a hash signature can include one or more hash values or hashes that reflect attributes of a data point in a standardized format. In some embodiments, hash signatures approximate similarity metrics in their collisions when mapped to hash partitions. Similarly, as used herein, the term "MinHash signature" refers to a hash signature generated utilizing a MinHash algorithm. A MinHash signature can likewise include a series of MinHash values for a user or other represented data point. Relatedly, as used herein, the term "locality-sensitive hashing" refers to an algorithmic technique that hashes similar input items into hash partitions or buckets.

As used herein, the term "queried user" refers to a user or a corresponding data point that is an object or a subject of a particular determination or calculation. In particular, a queried user can include a user or a corresponding data point for which the dynamic clustering system determines a local density or a separation distance from another user of higher density, such as a queried user referenced in a function for determining local density or separation distance. As suggested above, a queried user may also include a queried multi-dimensional data point as an object or a subject of a particular determination or calculation.

Also, as used herein, the term "local density" refers to a count of users surrounding or neighboring a user or other represented data point. In particular, the term local density can include a count of users or other data points that both have at least a threshold number of shared hash partitions with a queried user and satisfy a separation-distance threshold of a queried user in multi-dimensional space. In one or more embodiments, the dynamic clustering system determines local density utilizing join, filter, and group-by operations as described below.

Further, as used herein, the term "separation distance" refers to a relative similarity between two users or data points or a measure of value differences between two users or data points. In particular, separation distance can include the relative similarity or relative proximity in values between two points as distance in a multi-dimensional space. In some embodiments, separation distance is measured from 0.0 to 1.0, with 0.0 reflecting a separation distance between identical data points. The dynamic clustering system can determine separation distance as Jaccard distance, Manhattan distance, Euclidean distance, or other similarity distance metrics. Relatedly, as used herein, the term "separation-distance threshold" refers to a threshold of separation distance relative to a queried point. For example, a separation-distance threshold can include a maximum distance at which a user will be included in a local density for a queried user.

Additionally, as used herein, the term "retrieval probability" refers to the likelihood that a data point will be returned by an operation or function. In particular, a retrieval probability can include the likelihood that a user within a separation-distance threshold of a queried user will share a threshold number of hash partitions with the queried user. In one or more embodiments, the dynamic clustering system utilizes a retrieval probability to correct local densities for a dataset.

Also, as used herein, the term "nearest local user of higher density" refers to a user or other data point that has higher density than a queried user or data point and has the lowest separation distance relative to the queried user. In some embodiments, the dynamic clustering system assigns users or data points to the same segment as the users' or data-points' nearest local user of higher density. To illustrate, the dynamic clustering system can utilize hierarchal clustering based on the nearest local user of higher density. In one or more embodiments, the dynamic clustering system identifies a nearest local user of higher density utilizing join, filter, and group-by operations as explained below.

Further, as used herein, the term "non-collision probability" refers to a likelihood that two points of data do not share a hash partitions. In particular, a non-collision probability refers to the likelihood that the nearest local user of higher density for a queried user does not share a hash partitions with the queried user. Relatedly, the term "probability threshold" refers to a non-collision probability below or at which a system reevaluates or redetermines a nearest local user of higher density for a queried user. A probability threshold can include a non-collision probability at which, if not satisfied, the dynamic clustering system determines whether an actual nearest local user of higher density may exist to identify a corrected nearest user of higher density.

Additionally, as used herein, the term "segment" refers to a group or cluster of users or other data points corresponding to one or more characteristics or events. In particular, a segment can include a grouping of users based on user characteristics and/or user behavior as represented by multi-dimensional values representing users within a dataset. In one or more embodiments, the dynamic clustering system determines user segments utilizing clustering algorithms, such as a density-peaks-clustering algorithm or density-based-clustering algorithm. Similarly, the term "subsegments" refers to a segment within a segment or a portion of users or other data points within a segment.

Further, as used herein, the term "user pairing" refers to two users. In particular, a user pairing can include two users identified as having shared hash values and/or local-density quantiles. To illustrate, the dynamic clustering system can identify a user pairing based on a join operation. Additionally, the dynamic clustering system can perform filter and group-by operations on user pairings to determine local densities and separation distances, as described below.

Also, as used herein, the term "local-density quantiles" refers to a set of local densities divided by a frequency distribution into equal groups based on a randomized variable. In particular, local-density quantiles can represent a division or partitioning of users or other data points into groups each containing an equal (or relatively equal) fraction of a queried number of users (e.g., relatively equal fractions where the data does not divide or partition evenly). As explained below, the dynamic clustering system can utilize local-density quantiles in a grouping operation to identify eligible user pairings when identifying a nearest local user of higher density.

As used herein, the term "key" refers to an input to or a reference point for a hash function. In particular, a key can be associated with a user, data point, or record. The dynamic clustering system can utilize keys of a fixed length reflecting corresponding data. In one or more embodiments, the dynamic clustering system utilizes hash identifiers, hash values, or combinations thereof as keys to perform various functions described below.

Additionally, as used herein, the term "multi-dimensional data point" refers to a data point comprising or corresponding to multiple values. In particular, a multi-dimensional data point can represent a user or other entity and comprise values representing user data in multi-dimensional space. To illustrate, a multi-dimensional data point can include a user and corresponding user attributes, user behavior, and/or a variety of metadata associated with a user.

Turning now to FIG. 1, this figure depicts a block diagram illustrating an exemplary system 100. Specifically, FIG. 1 illustrates the system 100 including client device(s) 102a-102n, an administrator device 104, a network 106, server device(s) 108, a data analytics system 110, a dynamic clustering system 112, an analytics database 114, and third-party server(s) 116. Although FIG. 1 illustrates a particular arrangement of the client device(s) 102a-102n, the administrator device 104, the network 106, and the server device(s) 108, various arrangements are possible.

As shown in FIG. 1, the client device(s) 102a-102n can respectively include client applications 103a-103n. Further, the administrator device 104 can include an analytics application 105. As discussed below with regard to FIG. 15, the client device(s) 102a-102n and the administrator device 104 can include any of a variety of types of computing devices.

In some embodiments, the client applications 103a-103n constitute software applications respectively installed on the client device(s) 102a-102n or each a web-based application accessed via the server device(s) 108. Similarly, in some embodiments, the analytics application 105 constitutes a software application installed on the administrative device 104 or a web-based application accessed via the server device(s) 108. In some embodiments, the client applications 103a-103n and/or the analytics application 105 include computer-executable instructions that, when executed by a processor, cause the client device(s) 102a-102n or the administrator device to send and/or receive digital content and present graphical user interfaces or interactive elements within such interfaces for a user to view.

Figure 15:
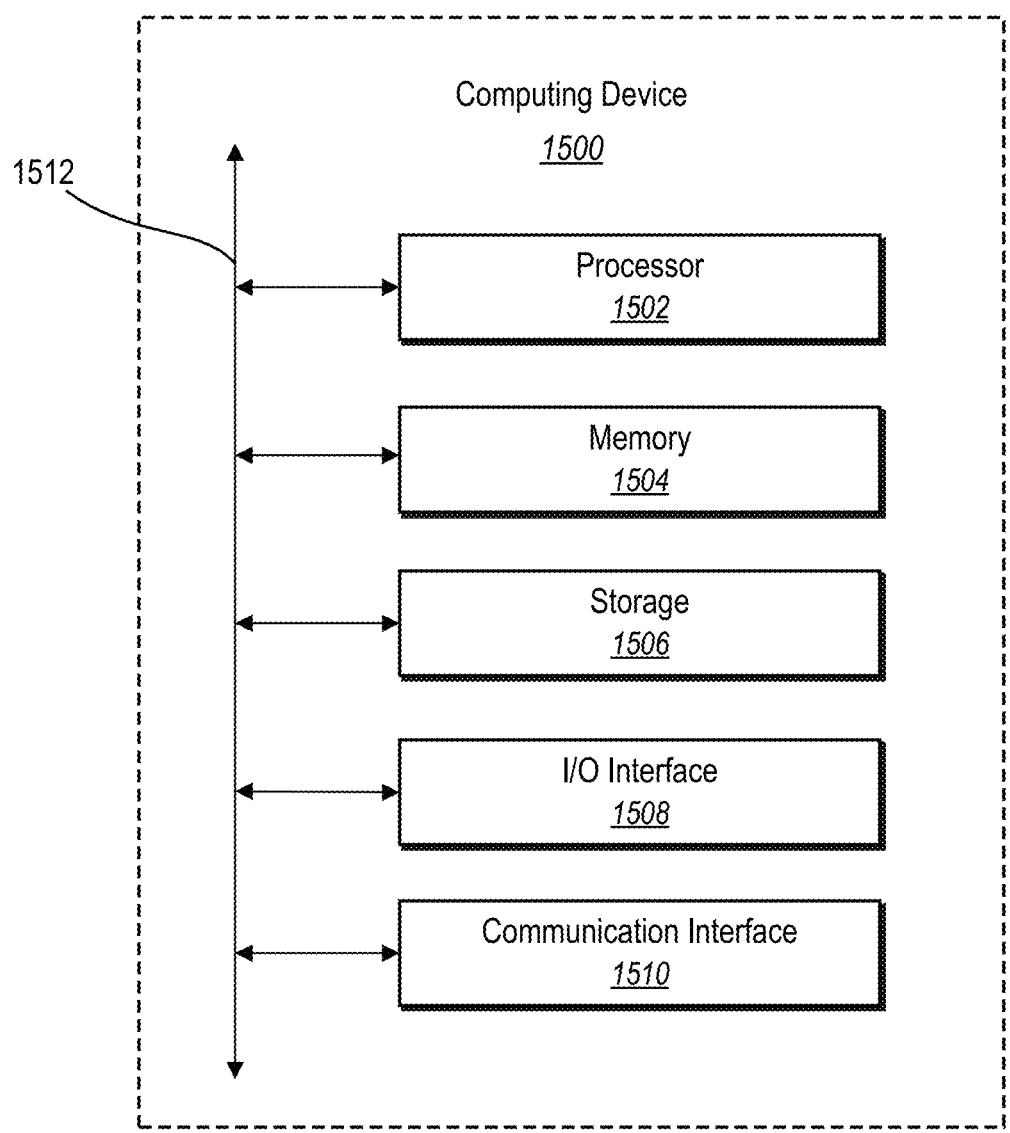
FIG. 15 illustrates a block diagram of an example computing device for implementing one or more embodiments of the present disclosure.

As further shown in FIG. 1, the client device(s) 102a-102n, the administrator device 104, the server device(s) 108, the analytics database 114, and the third-party server(s) 116 may be communicatively coupled with each other directly or indirectly, such as coupling through the network 106, which is described further in relation to FIG. 15. The client device(s) 102a-102n, the administrator device 104, the server device(s) 108, the analytics database 114, and the third-party server(s) 116 may include any kind of computing device, including one or more computing devices as discussed further below in relation to FIG. 15. In some embodiments, the server device(s) 108 comprise a data server, a communication server, or a web-hosting server and can generate, store, receive, and/or transmit any type of data, including user inputs requesting a rendering of a video. In certain implementations, the client device(s) 102a-102n and/or the administrator device 104 comprise a computing device that allows a corresponding user to send and receive digital communications.

Additionally, as shown in FIG. 1, the server device(s) 108 can include the data analytics system 110 and the dynamic clustering system 112. In general, the data analytics system 110 can facilitate the storage, rendering, and maintenance of various types of digital data. For example, the data analytics system 110 can manage scale datasets. Among other things, in some implementations, the data analytics system 110 can provide scale datasets to the dynamic clustering system 112 for analysis.

In addition to the analysis and management of various digital content, the data analytics system 110 can include the dynamic clustering system 112. The dynamic clustering system 112 (or the data analytics system 110) can use the server device(s) 108 to request from the third-party server(s) 116 (or retrieve from an analytics database 114) datasets. In some embodiments, the dynamic clustering system 112 receives datasets from the data analytics system 110. Upon receiving the datasets, the dynamic clustering system 112 identifies users corresponding to the dataset. Further, the dynamic clustering system 112 maps users to hash partitions. As mentioned above, the dynamic clustering system 112 utilizes the hash partitions to determine local densities and separation distances for users or other represented data points within the dataset. Additionally, the dynamic clustering system 112 uses the local densities and separation distances to determine segmentation of the users in the datasets.

As further illustrated in FIG. 1, the server device(s) 108 are communicatively coupled to the analytics database 114. Among other things, the analytics database 114 includes sparse datasets including users, records for users, and characteristics corresponding to individual users. In one or more embodiments, the dynamic clustering system 112 accesses and queries data from the analytics database 114 associated with segmentation requests. As shown in FIG. 1, the analytics database 114 is separately maintained from the server device(s) 108. Alternatively, in one or more embodiments, the dynamic clustering system 112 and the analytics database 114 comprise a single combined system or subsystem within the server device(s) 108 and/or the data analytics system 110.

As suggested by previous embodiments, the dynamic clustering system 112 can be implemented in whole or in part by the individual elements of the system 100. Although FIG. 1 illustrates the dynamic clustering system 112 implemented within the server device(s) 108, components of the dynamic clustering system 112 can be implemented in other components of the system 100. For instance, in some embodiments, the client device(s) 102a-102n comprise the dynamic clustering system 112 and performs all of the functions, methods, and processes of the dynamic clustering system 112 described above and below.

Figure 2:
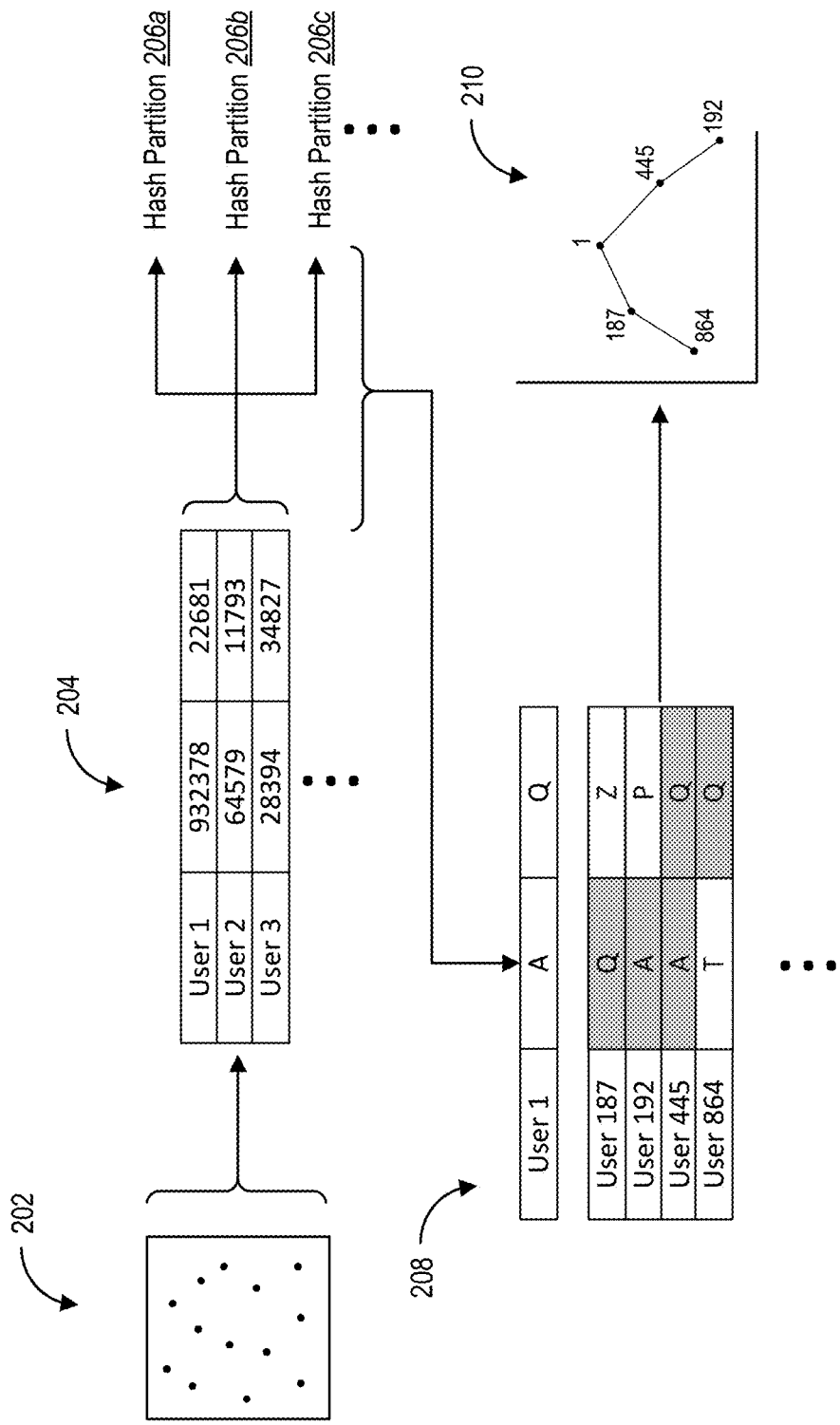
FIG. 2 illustrates an overview of the dynamic clustering system utilizing hash partitions to determine local densities and separation distances for data clustering in accordance with one or more embodiments.

As discussed above, the dynamic clustering system 112 can cluster users from a sparse dataset utilizing hash partitioning and a density-based-clustering algorithm. For instance, FIG. 2 illustrates an overview of the dynamic clustering system 112 mapping users to hash partitions and determining shared hash partitions for various users. Further, FIG. 2 illustrates the dynamic clustering system 112 utilizing the hash partitions as a basis for determining local densities and separation distances among users to generate clusters from a sparse dataset.

As shown in FIG. 2, the dynamic clustering system 112 can cluster a sparse dataset 202, such as a large and sparse dataset formatted in a matrix. FIG. 2 illustrates a portion of the sparse dataset 202 as data points in a two-dimensional space. However, such a sparse dataset can have any number of dimensions in a multi-dimensional space. For example, the sparse dataset can include a variety of multi-dimensional data points.

The sparse dataset 202 can reflect very large numbers of users and user interactions, including dynamic datasets logging millions of user interactions daily. Further, the sparse dataset 202 may be varying degrees of sparse, meaning it may include many empty values or "cells" of data for many users corresponding to various attributes, behavior, characteristics, dimensions, or variables. The dynamic clustering system 112 clusters sparse datasets 202 with a variety of parameters, sizes, and degrees of sparsity.

In some embodiments, the dynamic clustering system 112 generates hash signatures 204 for users from the sparse dataset 202. The hash signatures include multiple hash values corresponding to each user. Though FIG. 2 illustrates the hash signatures 204 including two hash values including six digits each, the dynamic clustering system 112 can utilize hash signatures including any number of hash values. Further, the dynamic clustering system 112 can utilize hash values including any number of digits. As described below with respect to FIG. 3, in one or more embodiments, the dynamic clustering system 112 generates hash signatures that approximate similarity metrics in their collisions when mapped to hash partitions.

As further shown in FIG. 2, the dynamic clustering system 112 maps the users to hash partitions 206a-206c based on the hash signatures 204. More specifically, the dynamic clustering system 112 hashes similar hash values, and accordingly their corresponding users, into the same hash partition from one of the hash partitions 206a-206c. In one or more embodiments, the dynamic clustering system 112 utilizes locality-sensitive hashing to map the hash values to hash partitions. Additionally, or alternatively, the dynamic clustering system 112 can utilize an identify hash function, a trivial hash function, folding, division hashing, multiplicative hashing, a customized hash function, or a variety of other hash function types. While FIG. 2 illustrates three hash partitions 206a-206c, the dynamic clustering system 112 can utilize a variety of numbers of hash partitions.

As shown in FIG. 2, the dynamic clustering system 112 can determine shared hash partitions 208. In particular, as shown in FIG. 2, User 1 is a queried or particular user. Accordingly, the dynamic clustering system 112 identifies other users sharing a threshold number of hash partitions with User 1. FIG. 2 illustrates shared hash partitions with shading for ease of understanding.

The dynamic clustering system 112 can utilize the users sharing the threshold number of hash partitions to determine local density and separation distances for the queried user. Additionally, based on the local density and separation distances, the dynamic clustering system 112 can cluster users into a segment 210 including the queried user. More broadly, the dynamic clustering system 112 determines clustering for each user in the sparse dataset 202. The segment 210 is one of a plurality of segments generated from the sparse dataset 202. As described below with regard to FIG. 8, in one or more embodiments, the dynamic clustering system 112 utilizes hierarchal clustering based on the local densities and separation distances determined utilizing the hash partitions.

Figure 3:
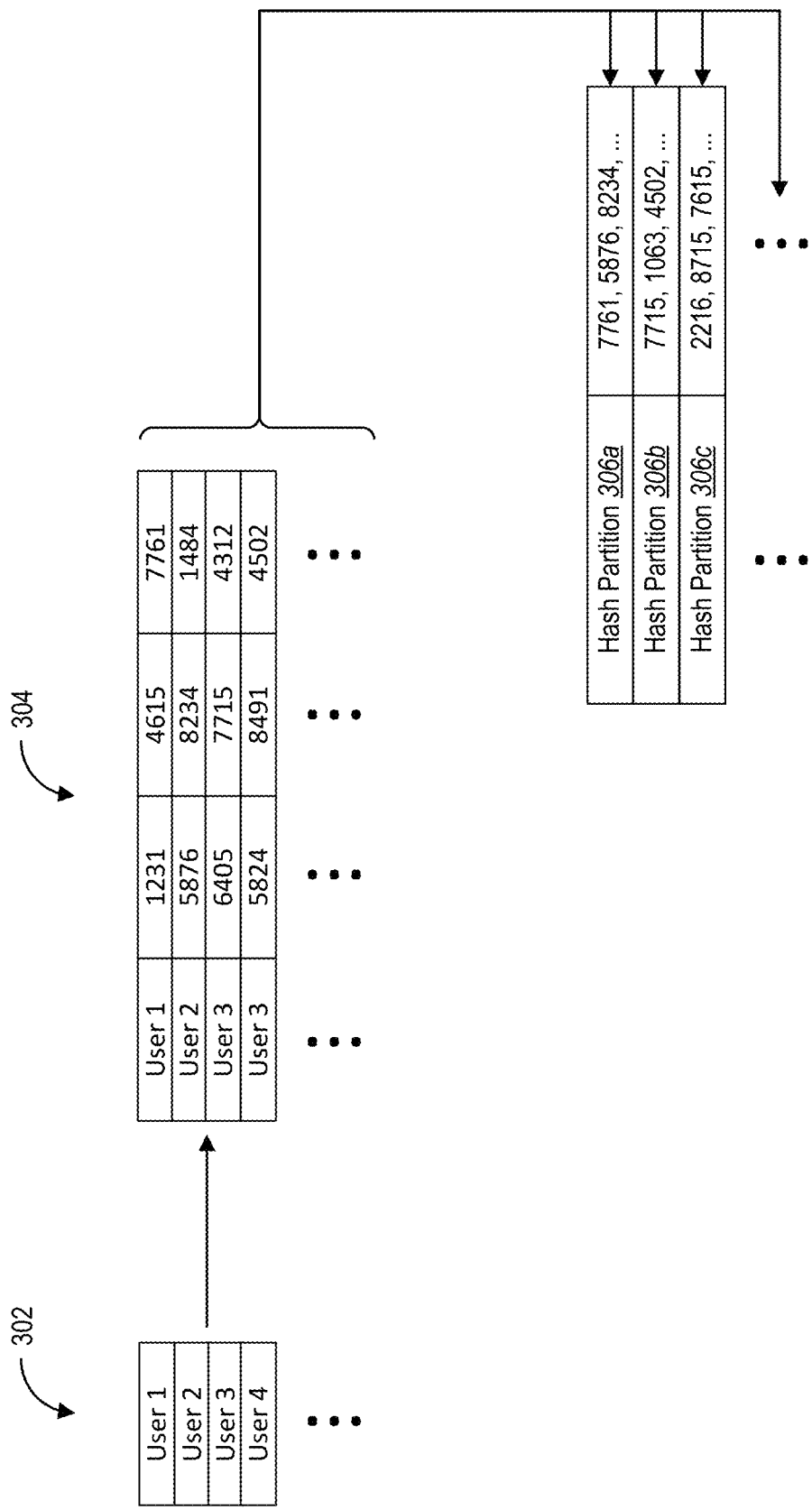
FIG. 3 illustrates the dynamic clustering system determining hash signatures and mapping data points to hash partitions in accordance with one or more embodiments.

As discussed above, the dynamic clustering system 112 generates hash signatures for users and maps such users to hash partitions based on those hash signatures. FIG. 3 illustrates additional detail for this hashing process. To cluster a dataset utilizing a density-peaks-clustering algorithm, the dynamic clustering system 112 determines local densities and separation distances corresponding to each user in a sparse dataset. To increase efficiency and flexibility, the dynamic clustering system 112 maps users to hash partitions before determining such densities and distances. Thus, the dynamic clustering system 112 can utilize shared hash partitions among users to identify users to consider when determining local densities and separation distances.

As shown in FIG. 3, in one or more embodiments, the dynamic clustering system 112 identifies a plurality of users 302 or other represented data points from a sparse dataset. Additionally, the dynamic clustering system 112 generates hash signatures 304 corresponding to each user from the sparse dataset. As shown in FIG. 3, each of the hash signatures 304 includes three hash values. Similar to the discussion above with regard to FIG. 2, however, the hash signatures may include a variety of numbers of hash values.

In one or more embodiments, the dynamic clustering system 112 employs a MinHash approach for generating hash signatures. For example, the dynamic clustering system 112 generates a MinHash signature for each user that approximates a similarity of user behavior when mapped to hash partitions. In some cases, a MinHash signature is a vector of MinHash values such that the similarity between two users is the probability of a MinHash collision between two MinHash signatures. The dynamic clustering system 112 produces MinHash signatures that can approximate similarity. More specifically, for a queried user or a queried multi-dimensional data point $u_1$ with a weight $w_t$, the dynamic clustering system 112 can determine MinHash signatures by defining each MinHash function $h_k$ by the smallest element of a set of columns $T_i$ under ordering induced by the below function for weighted set similarity with a domain Un.

$$h_k(u_i) = \operatorname*{argmin}_{t \in T_i} \frac{-\log(x)}{w_t}, \text{ where } x \sim Un(0, 1) \tag{1}$$

As further shown in FIG. 3, the dynamic clustering system 112 can map each hash value to a hash partition from hash partitions 306a-306c. As briefly noted above, in one or more embodiments, the dynamic clustering system 112 utilizes locality-sensitive hashing to map users to hash partitions. Further, in some embodiments, the dynamic clustering system 112 utilizes LSH to map hash values to a corresponding hash-partition identifier. In such embodiments, the dynamic clustering system 112 can identify users having shared hash partitions based on identifying users sharing hash-partition identifiers. In one or more embodiments, the number of shared hash partitions represents a MinHash similarity.

Figure 4A:
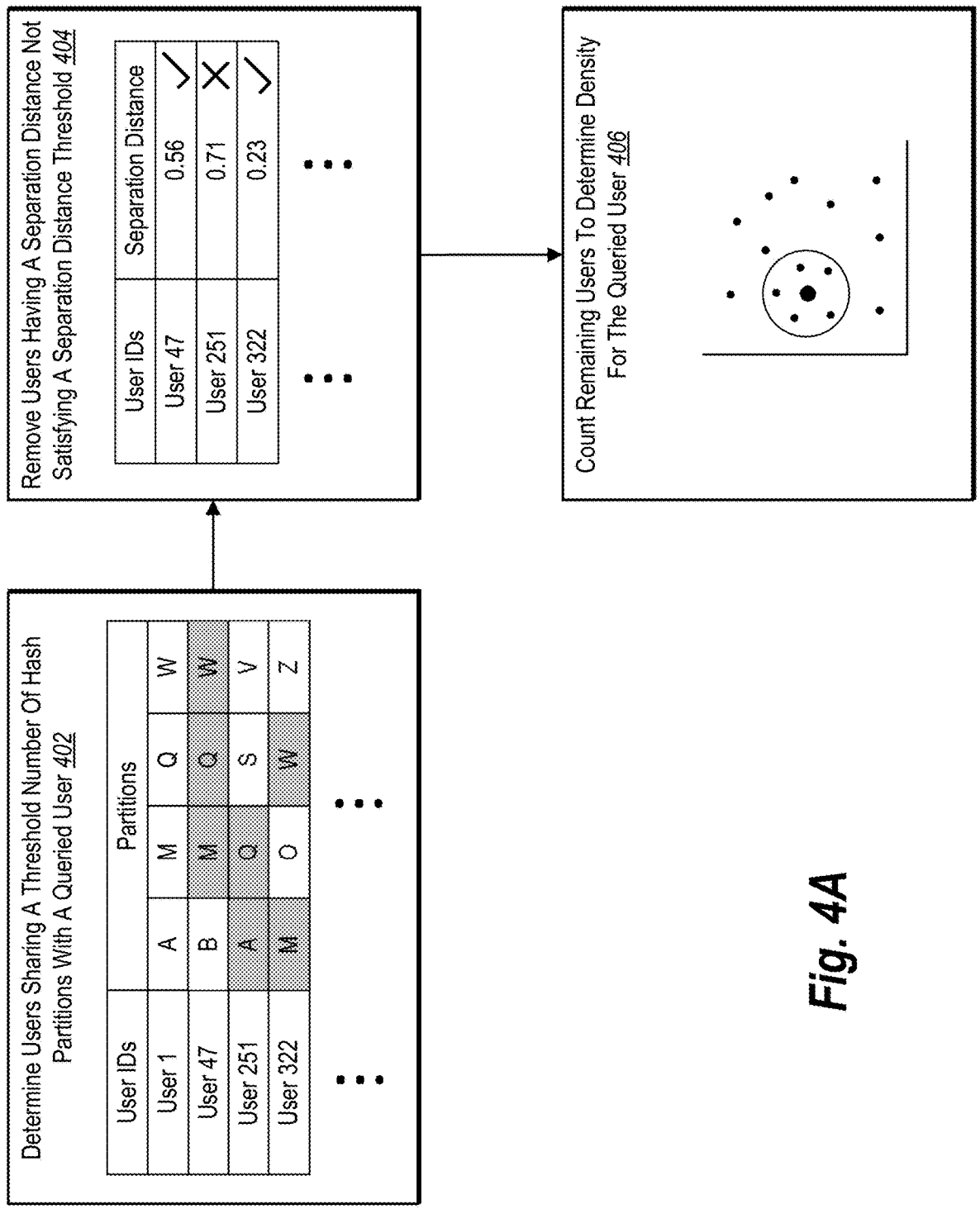
FIGS. 4A-4B illustrate an overview of the dynamic clustering system utilizing hash partitions to determine local densities and separation distances, respectively, in accordance with one or more embodiments.

The dynamic clustering system 112 utilizes these shared hash partitions to more efficiently determine local density for users in the sparse dataset. For example, FIG. 4A illustrates an overview of how the dynamic clustering system 112 utilizes shared hash partitions to accurately and efficiently determine local density for a queried user. Utilizing the method for determining separation distances and local density for a queried user over many iterations, the dynamic clustering system 112 determines local density for each of the users in the sparse dataset. More specifically, the dynamic clustering system 112 determines a local density by approximating a number of users having a separation distance that satisfies a separation-distance threshold. In some embodiments, the dynamic clustering system 112 defines the local density as the number of users that have a threshold number of shared hash partitions and satisfying the separation-distance threshold. To illustrate, the dynamic clustering system 112 can determine local densities by generating a probability distribution of users sharing hash partitions with the queried user.

As shown in FIG. 4A, the dynamic clustering system 112 can perform an act 402 of determining users sharing a threshold number of hash partitions with a queried user. As discussed above, the number of shared hash partitions can approximate similarity between two users and accordingly the separation distance between those two users. As part of determining a local density for a queried user, in some embodiments, the dynamic clustering system 112 generates a probability distribution of users sharing hash partitions with the queried user. The dynamic clustering system 112 can accordingly utilize this probability distribution to identify users to consider with regard to the queried user for a local density calculation. Thus, the dynamic clustering system 112 determines which users to consider with regard to the queried user by identifying users sharing a threshold number of hash partitions.

As suggested by FIG. 4A, in some embodiments, the dynamic clustering system 112 hashes each user to generate four hash values. As discussed above, the dynamic clustering system 112 can utilize a variety of numbers of hash values. Additionally, FIG. 4A illustrates a listing of users sharing the threshold number of hash partitions, in this case at least two, with User 1. The shared hash partitions are shaded in FIG. 4A for ease of understanding. In one or more embodiments, the threshold number of shared hash partitions is an administrator-defined integer reflecting the minimum number of shared hash partitions for consideration with regard to local density. As described below with regard to FIG. 10A, the dynamic clustering system 112 can determine accurate segments of users or other represented data points utilizing a variety of threshold numbers of shared hash partitions.

By identifying the users sharing the threshold number of hash partitions with User 1, the dynamic clustering system 112 can determine a number of users with approximate similarity within the separation-distance threshold without needing to evaluate the separation distance between User 1 and every other user in the sparse dataset. However, due to the nature of locality-sensitive hashing, the set of users sharing the threshold number of hash partitions with User 1 may include false positives that do not actually satisfy the separation-distance threshold.

To correct for these false positives, the dynamic clustering system 112 can perform an act 404 of removing users having a separation distance not satisfying a separation-distance threshold. In one or more embodiments, the dynamic clustering system 112 determines a separation distance between the queried user and each of the set of users sharing the threshold number of hash partitions with the queried user. Additionally, the dynamic clustering system 112 removes each user not satisfying the separation-distance threshold from consideration. Accordingly, in some embodiments, the dynamic clustering system 112 removes false positives from the local density.

As indicated by FIG. 4A, for example, the separation-distance threshold is 0.60. In this particular embodiment, separation distances below 0.60 satisfy the separation-distance threshold. As shown in FIG. 4A, the dynamic clustering system 112 determines that the separation distances for User 47 and User 322 fall below the separation-distance threshold and have a relatively great similarity to User 1 than other users. Accordingly, the dynamic clustering system 112 does not remove User 47 or User 322. However, the dynamic clustering system 112 also determines that the separation distance between User 1 and User 251 does not satisfy the separation-distance threshold. Accordingly, User 251 is a false positive, and the dynamic clustering system 112 removes User 251 from consideration with regard to the local density of User 1.

As further shown in FIG. 4A, the dynamic clustering system 112 can perform an act 406 of counting remaining users to determine density for the queried user. By counting the remaining users, the dynamic clustering system 112 counts the number of users that both (1) share the threshold number of hash partitions with the queried user and (2) have a separation distance with the queried user that satisfies the separation-distance threshold. In some embodiments, the dynamic clustering system 112 utilizes this count as the local density for the queried user.

FIG. 4A further illustrates the points encompassed within the local density of User 1. Similar to discussion above with regard to FIG. 2, though FIG. 4A illustrates the local density in two dimensions, the dynamic clustering system 112 can determine local density for sparse datasets with a variety of dimensions. Further, the dynamic clustering system 112 determines the local density accurately and efficiently by counting users neighboring a queried user sharing hash partitions from the sparse dataset.

As suggested above, in one or more embodiments, the dynamic clustering system 112 performs a false-negative correction to the local density. In some embodiments, the hashing may fail to include every user within the separation-distance threshold, because some users within the separation-distance threshold may not share the threshold number of hash partitions with the particular user. In these embodiments, to generate more accurate local density, the dynamic clustering system 112 determines a correction for the local density based on the probability that a user satisfying the separation-distance threshold would share the threshold number of hash partitions with the queried user.

More specifically, given a set of hash partitions on the hash signatures, the dynamic clustering system 112 can model the density for a queried user or a queried multi-dimensional data point within a cutoff distance $d_c$. In one or more embodiments, the dynamic clustering system 112 determines local density p as illustrated by the following Structured Query Language ("SQL") density expression:

SELECT COUNT(DISTINCT points) AS density

WHERE $LSH\_collision(p, points) >= N$

AND $distance(p, points) < d_c$

Further, the dynamic clustering system 112 can determine a correction using the following probability calculation. Taking the similarity of the two points as s, the probability that two points share the same hash partition is $s^r$, where r is the number of rows in a hashing band. For the probability $s^r$, the number of collisions of hash partitions between two points $N_c$ follows a binomial distribution. Accordingly, the probability that $N_c$ is greater than a threshold number of shared hash partitions N, follows the cumulative probability function:

$$P(N_c \geq N \mid s^r) = \sum_{i=N}^{N_B} \binom{N_B}{i} (s^r)^i (1 - s^r)^{N_B - i} \quad (2)$$

The dynamic clustering system 112 can further utilize the determined probability to determine a total local density of a queried point as Ns, where N represents the threshold number of shared hash partitions, $N_B$ represents the number of bands in the hashing, and $N_C$ represents the number of shared hash partitions between two users. Based on the probability P, in one or more embodiments, the dynamic clustering system 112 determines the local density via the following expectation function, where $E(Y_s)$ represents the observed number of points having similarity s with the queried user:

$$E(Y_s) = P(N_c >= N \mid s^r) \times Ns \quad (3)$$

By summing all total local densities obtained from observed points, the dynamic clustering system 112 generates a more accurate local density for a queried user. For example, if the query returns two points with s=0.6 and one point with s=0.5, the approximated ρ will be $$\frac{2}{08.34} + \frac{1}{0.623} = 4.00.$$

In some embodiments, the dynamic clustering system 112 determines local density for each user or each multi-dimensional data point using the SQL density expression, function (2), and function (3).

Figure 4B:
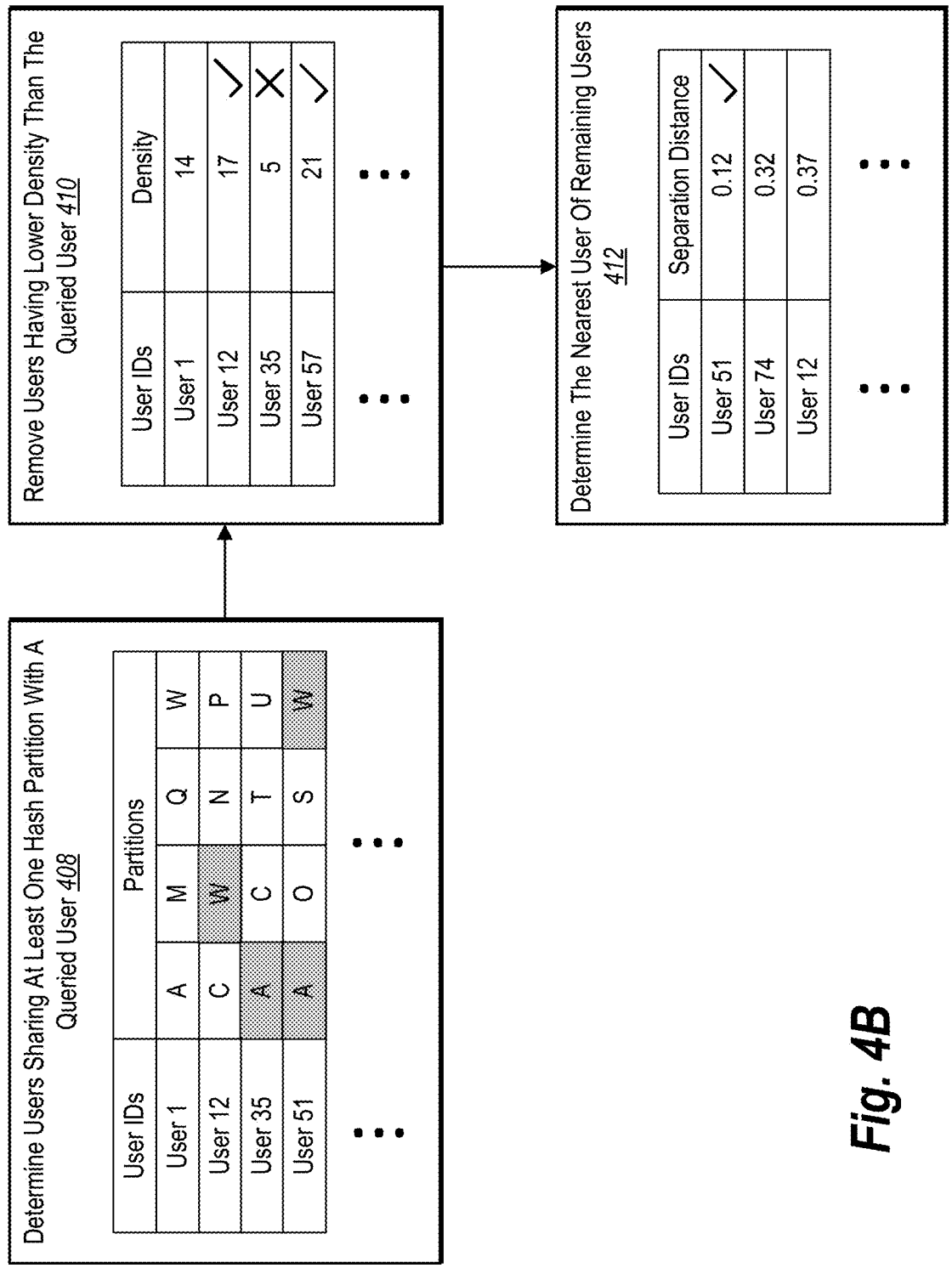

As discussed above, in one or more embodiments, the dynamic clustering system 112 utilizes hash partitioning to efficiently determine separation distances. Turning to FIG. 4B, the dynamic clustering system 112 provides an overview for the dynamic clustering system 112 determining separation distances for a queried user and identifying a nearest local user of higher density. In one or more embodiments, the dynamic clustering system 112 identifies the nearest local user of higher density for a queried user by selecting the user with the lowest separation distance from the queried user having a higher density than the queried user.

As shown in FIG. 4B, for instance, the dynamic clustering system 112 can perform an act 408 of determining users sharing at least one hash partition with a queried user. As discussed above, shared hash partitions approximate similarity between two users. Accordingly, in one or more embodiments, the dynamic clustering system 112 identifies users to consider as the nearest local user of higher density by identifying users sharing at least one hash partition. Thus, the dynamic clustering system 112 can more efficiently identify the nearest local user of higher density by considering only users with a sufficient degree of similarity.

As shown in FIG. 4B, the dynamic clustering system 112 hashes the users to generate four hash values using a hashing function, where Users 12, 35, and 51 share hash values with User 1 as shaded. However, as discussed above, the dynamic clustering system 112 can hash each user into a variety of numbers of hash partitions based on a variety of numbers of hash values per user. Additionally, FIG. 4A illustrates only a portion of the users or data points from a sparse dataset.

Further, in one or more embodiments, the dynamic clustering system 112 performs act 410 of removing users having lower density than the queried user. That is, as discussed above with regard to FIG. 4A, the dynamic clustering system 112 can determine local density for each user in a sparse dataset. In one or more embodiments, the dynamic clustering system 112 utilizes these local densities for each of the users identified at act 408 to compare against the density of the queried user. As the nearest local user of higher density has a higher density than the queried user, the dynamic clustering system 112 removes users with lower density than the queried user from consideration.

For example, as shown in FIG. 4B, User 1 has a density of 14. Thus, the dynamic clustering system 112 removes User 35 from consideration because User 35 has a density of 5, which is less than that of User 1. However, as shown in FIG. 4B, the dynamic clustering system 112 does not eliminate User 12 or User 57, as each has a higher density than User 1.

As further shown in FIG. 4B, the dynamic clustering system 112 performs act 412 of determining the nearest user of remaining users. As remaining users each have a higher density than the queried user, the dynamic clustering system 112 can identify the nearest local user of higher density by identifying the user with the lowest separation distance from the queried user. For example, as shown in FIG. 1, the dynamic clustering system 112 determines separation distances between User 1 and each remaining user. Further, the dynamic clustering system 112 orders the separation distances from lowest to highest. Additionally, the dynamic clustering system 112 identifies User 51 as the nearest local user of higher density for User 1 by determining that User 35 has the lowest separation distance from User 1.

Given a set of hash partitions on has signatures, in one or more embodiments, the dynamic clustering system 112 identifies the nearest local user of higher density utilizing the following separation distance SQL expression:

SELECT TOP(points) AS nn

WHERE $LSH\_collision(p,points) \geq 1$

AND $p.density < points.density$

ORDER BY $distance(p,points)$ ASC

In one or more embodiments, the dynamic clustering system 112 utilizes the nearest local user of higher density in conjunction with a density-peaks-clustering algorithm to determine user segments. The dynamic clustering system 112 identifies the nearest local user of higher density without determining the separation distance between the queried user and every other user in the sparse dataset. While this improves efficiency, by limiting determinations of separation distance to users with at least one shared hash partition, the dynamic clustering system 112 may initially misidentify the nearest local user of higher density. More specifically, the dynamic clustering system 112 may initially identify a user sharing a hash partition with the queried user as the nearest local user of higher density in a case where the actual nearest user of higher density does not share at least one hash partition of the queried user. As explained below, by determining a likelihood of misidentification, such as by determining a non-collision probability, the dynamic clustering system 112 can identify when the nearest local user of higher density is not an actual nearest user of higher density for a queried user and make a corresponding correction.

Before searching for a corrected nearest user of higher density, in some contexts, the dynamic clustering system 112 determines whether (i) a non-collision probability that the actual local user of higher density does not share at least one hash partition with the queried user satisfies (ii) a probability threshold, as explained below. Upon determining the non-collision probability is higher than the collision probability for a queried user, in some embodiments, the dynamic clustering system 112 determines a corrected nearest user of higher density.

To illustrate, the dynamic clustering system 112 can determine a non-collision probability that the nearest local user of higher density does not share at least one hash partition with a queried user. To determine this non-collision probability, the dynamic clustering system 112 assumes that an actual user of higher density does not have any collisions with the queried user, as the dynamic clustering system 112 would have identified such a user at act 412. Additionally, the dynamic clustering system 112 assumes that the separation distance between the queried user and the actual nearest user of higher density must be lower than the separation distance between the queried user and the identified or retrieved nearest local user of higher density.

To determine the non-collision probability in function (4) below, the dynamic clustering system 112 uses $δ_i$, to represent the distance between the actual nearest user of higher density and the queried user, $nn_i$ to represent the identified or retrieved nearest local user of higher density, and $nn$ to represent the actual nearest user of higher density. As further indicated by function (4), the dynamic clustering system 112 represents the probability that two points share the same hash partition $s^r$, where the probability that the actual nearest user of higher density and the queried user share at least one hash partition is $s_{nn}{}^r$. Thus, taking $N_B$ as the number of bands in the hashing, the dynamic clustering system 112 can determine the accuracy of distance $\delta_i$ and bound the non-collision probability as follows:

$$\text{Accuracy}(\delta_i) = 1 - P(nn_i \neq nn) \quad (4)$$
$$= P(\text{no } LSH \text{ collisions between } p_i \text{ and } nn_i)$$
$$= 1 - (1 - s_{nn}^r)^{N_B} > 1 - \int_s^1 (1-s^r)^{N_B} ds$$

The integral determines the sum of chances that the actual nearest user of higher density and the queried user does not share at least one hash partition for any possible outcome that has a similarity greater than the retrieved nearest local user of higher density. Upon determining an accuracy of distance $\delta_i$ for the retrieved nearest local user of higher density, the dynamic clustering system 112 can determine whether to generate a corrected nearest user of higher density. In one or more embodiments, the dynamic clustering system 112 identifies a corrected nearest user of higher density upon determining that the non-collision probability does not satisfy a probability threshold.

As a probability-threshold determination, for instance, the dynamic clustering system 112 may determine that (i) a non-collision probability that the actual local user of higher density does not share at least one hash partition with the queried user exceeds (ii) a collision probability that the actual local user of higher density shares at least one hash partition with the queried. Alternatively, the dynamic clustering system 112 may set a probability threshold for a non-collision probability at equal to or more than 50%, 60%, 70%, or another probability threshold number.

In some embodiments, to determine a corrected nearest user of higher density, the dynamic clustering system 112 identifies a high-density set of users from within a sparse dataset. For example, the dynamic clustering system 112 may identify the top 700, 800, or 1000 data point of highest densities (from among a large and sparse data matrix) as a high-density set of users. As cluster centers are normally dense, such a high-density set of users is likely to contain the actual nearest user of higher density when the non-collision probability fails to satisfy the probability threshold.

In one or more embodiments, the dynamic clustering system 112 determines separation distances between the queried user and each user in the high-density set of users. Based on such separation distances, the dynamic clustering system 112 identifies a corrected nearest user of higher density from among the high-density set of users with a separation distance smaller than that of the retrieved nearest local user of higher density. Additionally, in one or more embodiments, the dynamic clustering system 112 determines that the corrected nearest user of higher density has higher density than the queried user and does not share any hash partitions with the queried user. Based on each of these determinations, in some cases, the dynamic clustering system 112 identifies the corrected nearest user of higher density.

Figure 5:
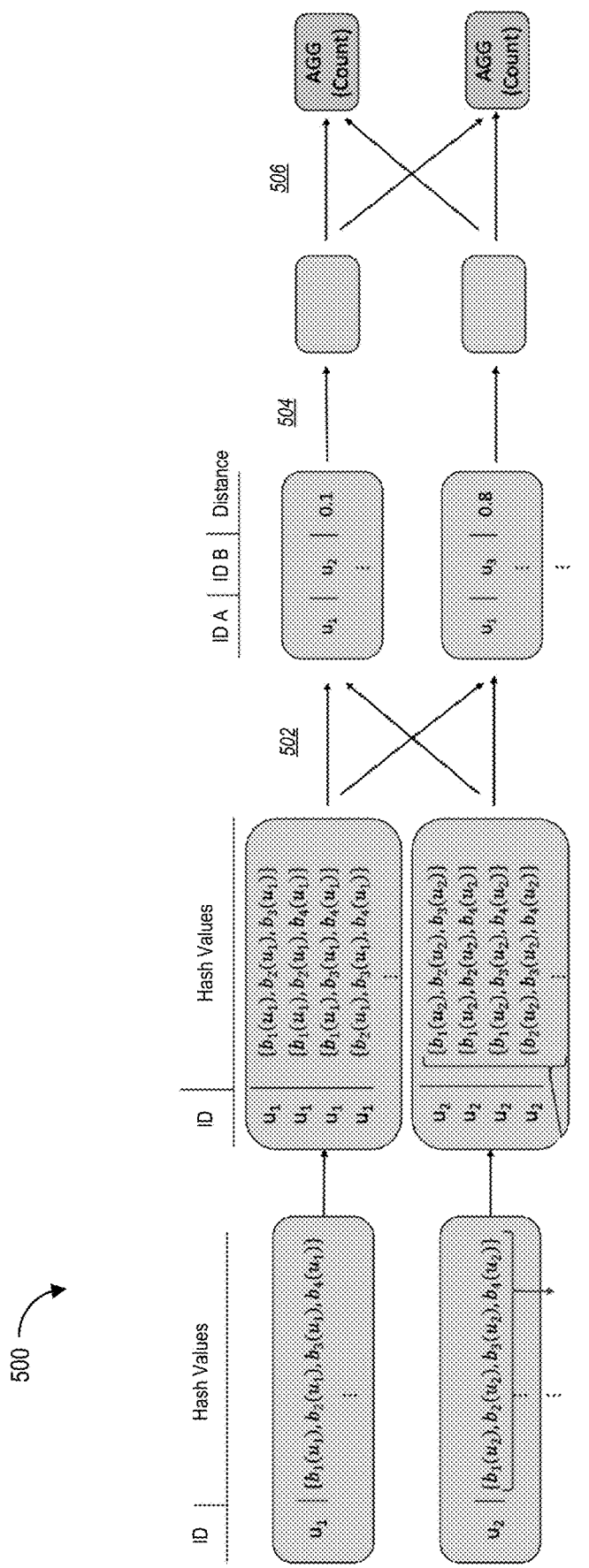
FIG. 5 illustrates the dynamic clustering system joining, filtering, and grouping hash partitions by conditions to determine local density in accordance with one or more embodiments.
Figure 6:
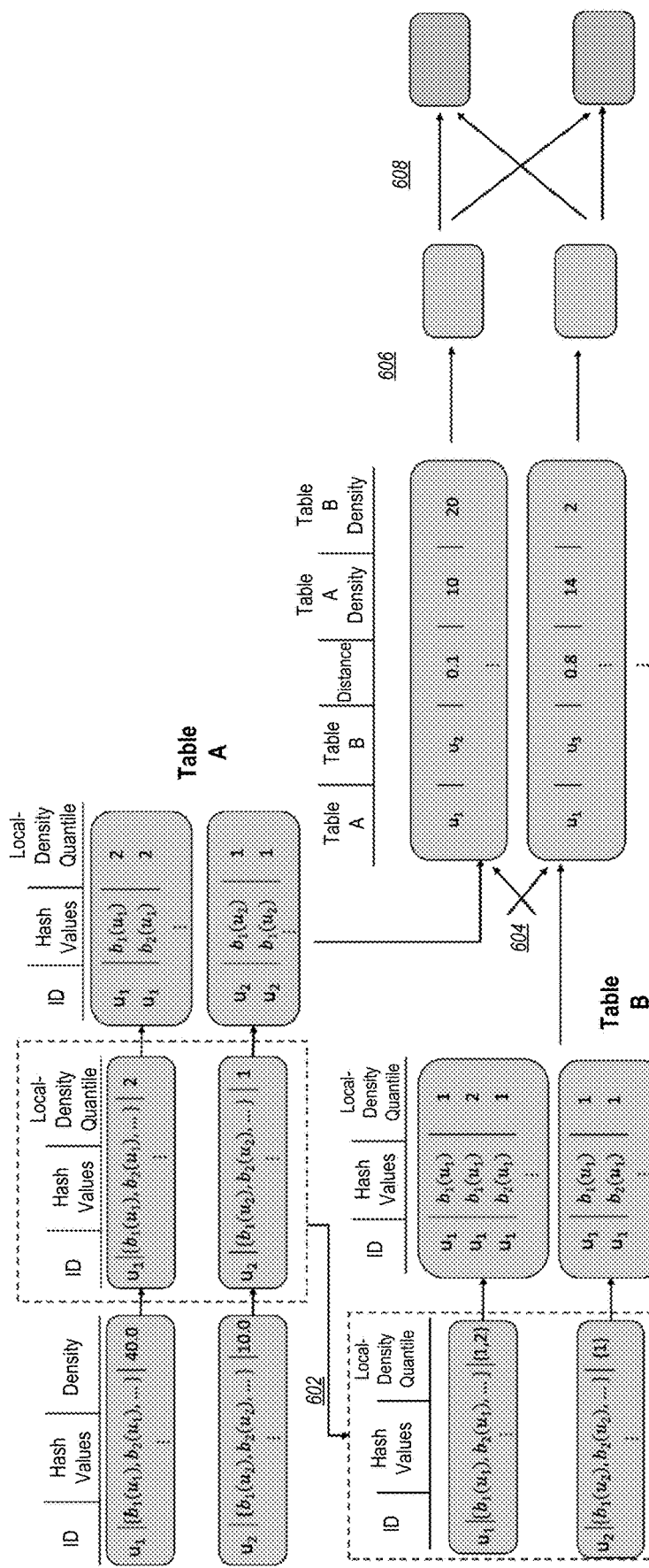
FIG. 6 illustrates the dynamic clustering system joining, filtering, and grouping hash partitions by conditions to determine distances in accordance with one or more embodiments.

As suggested above, the dynamic clustering system 112 can utilize join, filter, and group-by operations when determining local densities and separation distances for sparse datasets. FIGS. 5-6 illustrate the dynamic clustering system 112 using such operations in determining local densities and separation distances, respectively. While FIGS. 5-6 illustrate an example of the join, filter, and group-by operations, the dynamic clustering system 112 can facilitate parallel processing of many join, filter, and group-by pipelines at once.

To further improve efficiency in this parallel processing, the dynamic clustering system 112 can distribute data across different hash partitions. All hash partitions execute tasks concurrently until the dynamic clustering system 112 re-partitions the data in a shuffle step. This shuffle step facilitates join and group-by operations where data points (e.g. users) with the same hash value must reside in the same hash partition. To compute hash signatures and hash partitions, the dynamic clustering system 112 calculates hash values for each data point (e.g., user). However, plain join and group-by operations have the potential to result in uneven distribution of data among hash partitions and explosion of intermediate results. To avoid these bottlenecks in clustering a sparse dataset, the dynamic clustering system 112 utilizes shuffle steps to (1) reduces the number of duplicate keys when joining or grouping two tables, and (2) ensures an even distribution among hash partitions.

When two tables join with duplicate keys, the number of intermediate products grows quadratically. This growth produces a high memory and network pressure to the hash partitions. For example, only joining data by a subset of hashes can cause highly similar pairs to have multiple collisions. To avoid such pressure on the system, the dynamic clustering system 112 introduces additional criteria to reduce the number of duplicate keys. This reduces unnecessary collisions when joining or grouping tables. Accordingly, the dynamic clustering system 112 can process data within the memory of the computing nodes, without exceeding available memory. Thus, the dynamic clustering system 112 can utilize the speed and efficiency of processing within the memory of the computing nodes while optimizing the use of limited memory.

As discussed above, the dynamic clustering system 112 runs hash partitions concurrently until all hash partitions finish their tasks. Accordingly, larger hash partitions require more time to process than smaller hash partitions, which can cause bottlenecks. To maintain efficiency, the dynamic clustering system 112 ensures that all hash partitions share a similar quantity of data. Thus, the tasks will not be slowed waiting on a particularly large hash partition.

For ease of explanation, the following disclosure related to FIGS. 5-6 explains applying the join, filter, and group-by operations to users and utilizing user identifiers. However, the dynamic clustering system 112 can also determine local densities and separation distances corresponding to multi-dimensional data points, including multi-dimensional data points associated with users. In such implementations, the dynamic clustering system 112 can utilize user identifiers corresponding to the multi-dimensional data points or can utilize identifiers for the multi-dimensional data points themselves.

FIG. 5 illustrates the dynamic clustering system 112 utilizing an operation sequence 500 to determine local densities of queried users using join, filter, and group-by operations. In some embodiments, the dynamic clustering system utilizes a join, filter, and group-by pipeline to efficiently calculate density utilizing the hash partitions. The dynamic clustering system can join hash signatures utilizing the hash partitions as keys to identify user pairings sharing the threshold number of hash partitions. Additionally, in one or more embodiments, the dynamic clustering system filters the user pairings based on the separation-distance threshold. Further, the dynamic clustering system can utilize a group-by operation based on user identifiers to determine a count of user pairings returned by the filtering operation. Thus, the dynamic clustering system can determine local density as the remaining count.

As shown in FIG. 5, the dynamic clustering system 112 organizes the user identifiers into one column and corresponding hash values making up hash signatures into another column in the same table. For example, in the upper left hand side of FIG. 5, in the first hash values column, the upper row includes a hash signature of $\{b_1(u_1), b_2(u_1), b_3(u_1), b_4(u_1)\}$. Additionally, in one or more embodiments, the dynamic clustering system 112 combines hash signatures to prepare for a join operation. As shown in FIG. 5, the dynamic clustering system 112 organizes the joined users into a column and their corresponding combined hash signatures into another column. For example, in the first row of the second hash values column, FIG. 5 shows the combined hash values $\{b_1(u_1), b_2(u_1), b_3(u_1)\}$.

As further shown in FIG. 5, the dynamic clustering system 112 performs a join operation 502 utilizing the hash signatures as the key to collect collided user pairings. For instance, the dynamic clustering system 112 utilizes the join operation 502 to collect user pairings sharing a threshold number of hash partitions. The dynamic clustering system 112 organizes these user pairings in a table including the user identifier of the queried user $u_1$ and user identifiers corresponding to various users paired with the queried user (e.g., $u_2$, $u_3$).

To apply the condition of sharing the threshold number of hash partitions to the join operation 502, the dynamic clustering system 112 reduces the number of duplicated joined user pairings from highly similar pairs of users. Because these highly similar pairs of users share many of the same hash partitions, the dynamic clustering system 112 can directly utilize the combination of hash values as keys in the join operation 502.

For example, in a sparse dataset with ten hashes, the dynamic clustering system 112 identifies pairs of users having five shared hash partitions. Further, the dynamic clustering system 112 generates a table of users with each possible combination of hash partitions in separate rows. Thus, the joined user pairings are guaranteed to have at least five shared hash partitions. However, the dynamic clustering system 112 only joins the pairs having the five shared hash partitions once, resulting in improved efficiency.

As discussed above, in one or more embodiments, the dynamic clustering system 112 performs the join operation 502 in a distributed computing system, such as a computing platform using Spark SQL. Accordingly, in some embodiments, the dynamic clustering system 112 re-partitions the users during the join operation 502. As also discussed above, the dynamic clustering system 112 performs this re-partitioning of users during the join operation 502 as a shuffle step to facilitate execution of various tasks concurrently. This improves efficiency in both speed of operation and memory utilized for the join operation 502.

As further shown in FIG. 5, the dynamic clustering system 112 can determine distances for each of the joined user pairings. Upon determining separation distances for each joined user pairing, the dynamic clustering system 112 includes a distance for each of the identified user pairings in a corresponding column. Thus, as discussed above, the dynamic clustering system 112 does not need to determine pairwise distances between each user in the sparse dataset. Instead, the dynamic clustering system 112 determines distances between the user pairings that are already determined to have a sufficient degree of similarity based on sharing the threshold number of hash partitions. Though FIG. 5 lists example distances of 0.1 and 0.8, the dynamic clustering system 112 can calculate a variety of distances.

As discussed above with regard to FIG. 4A, the dynamic clustering system 112 can remove false positives from the user pairings by removing from a density calculation users having a separation distance that does not satisfy the separation-distance threshold. As shown in FIG. 5, the dynamic clustering system 112 utilizes a filter operation 504 to remove any user pairings having a separation distance not satisfying such a separation-distance threshold. For example, the dynamic clustering system 112 can utilize a separation-distance threshold of 0.5, 0.6, or a variety of separation distance thresholds to remove user pairings no satisfying a separation-distance threshold.

In one or more embodiments, the dynamic clustering system 112 performs the filter operation 504 in part by removing any duplicate user pairings from consideration of a density calculation. For example, the dynamic clustering system 112 recognizes identical user pairings during the filter operation 504 and passes only one of the identical user pairings on to the next operation. Accordingly, the dynamic clustering system 112 eliminates any repeated user pairings yielded in the join operation 502.

After performing the filter operation 504, the dynamic clustering system 112 yields a set of users that both (1) share the threshold number of hash partitions with the queried user and (2) have distances from the queried users that satisfy the separation-distance threshold. Thus, in some embodiments, the dynamic clustering system 112 counts the number of users yielded by the filter operation 504 to determine the local density. As shown in FIG. 5, to aggregate and count the users, the dynamic clustering system 112 performs a group-by operation 506. The group-by operation 506 utilizes user identifier as the key to aggregate users by count. Thus, the dynamic clustering system 112 determines the local density as a count. As shown in FIG. 5, for instance, the dynamic clustering system 112 determines a local density of a queried user by quantifying a number of users that share a threshold number of hash partitions with the queried user and satisfy the separation-distance threshold in relation to the queried user.

As discussed above, the dynamic clustering system 112 can utilize batch processing to update local densities and separation distances in response to updates to a sparse dataset. For example, the dynamic clustering system 112 determines that a new subset of data was added to the sparse dataset. The dynamic clustering system 112 can implement batch processing in determination of local densities by replacing the new subset of data for one of the tables at the join operation 502. The join operation 502 further processes between a table containing all users (and their corresponding data points) and a table containing the new subset of users (and their corresponding data points). Additionally, the dynamic clustering system 112 can perform the filter operation 504 and the group-by operation 506 as described above to update local density calculations in light of the new subset of users.

Similar to the join operation 502, the dynamic clustering system 112 performs the group-by operation 506 in a distributed computing system, such as a computing platform using Spark SQL. Thus, in one or more embodiments, the dynamic clustering system 112 re-partitions the users as part of the group-by operation 506. This shuffle step facilitates execution of various tasks concurrently and improves efficiency in both speed of operation and memory utilized for the group-by operation 506.

As indicated above, the dynamic clustering system 112 also utilizes an operation sequence 600 to determine separation distances and identify nearest local users of higher density using join, filter, and group-by operations. The dynamic clustering system can also utilize a join, filter, and group-by pipeline to identify the nearest local user of higher density for a queried user. In some embodiments, the dynamic clustering system determines local-density quantiles for users and performs a join operation utilizing hash partitions and local-density quantiles as keys to identify user pairings sharing at least one hash partition. Further, the dynamic clustering system 112 can filter the candidate pairs based on the local-density quantiles to remove users with lower density than the queried user form consideration. In some embodiments, the dynamic clustering system also utilizes a group-by operation to aggregate remaining user pairings utilizing minimum distance. Thus, the dynamic clustering system can identify the minimum separation distance between the queried user and the users identified by the pipeline to find the nearest local user of higher density.

As shown in FIG. 6, the dynamic clustering system 112 organizes user identifiers, corresponding hash values making up hash signatures, and corresponding local densities. For example, as shown in the upper left hand corner of FIG. 6, the dynamic clustering system 112 organizes into two rows of a table (i) user identifiers, (ii) hash values into hash signatures, and (iii) local densities. More specifically, in the first row corresponding to $u_1$, the upper row includes hash values making up the hash signature $\{b_1(u_1), b_2(u_1), \ldots\}$, which is abbreviated for purposes of illustration. Additionally, FIG. 6 shows the density 40.0 in the row corresponding to $u_1$.

Using the process illustrated in FIG. 5, the dynamic clustering system 112 determines a local density for each user in the sparse dataset. Though FIG. 6 shows example local densities 40.0 and 10.0, the dynamic clustering system 112 can calculate a variety of local densities. As further shown in FIG. 6, the dynamic clustering system 112 can determine local density quantiles corresponding to the user identifiers. Additionally, in one or more embodiments, the dynamic clustering system 112 generates a column for local-density quantiles corresponding to each of the user identifiers. For example, as shown in the upper table surrounded by a dashed box in the local-density quantile column, the dynamic clustering system 112 determines a local-density quantile for $u_1$ of 2, and a local-density quantile for $u_2$ of 1. More specifically, the dynamic clustering system 112 partitions the users into local-density quantiles based on their corresponding local densities. In some embodiments, the dynamic clustering system 112 utilizes the approxQuantile method as described by Michael Greenwald, Sanjeev Khanna, et al., "Space-efficient online computation of quantile summaries," *ACM SIGMOD Record* 30 (2001), the entire contents of which are incorporated by reference.

As shown in FIG. 6, the dynamic clustering system 112 incorporates the local-density quantiles into the data structure as a column in both Table A and Table B. Additionally, the dynamic clustering system 112 transforms the data to generate the Table A including the users identifiers, the corresponding hash values, and the corresponding local-density quantiles. As shown in FIG. 6, Table A includes two sections below column labels ID, Hash Values, and Local-Density Quantile. For example, the first row of Table A includes the user identifier $u_1$, the hash value $b_1(u_1)$, and the local-density quantile 2. The dynamic clustering system 112 generates Table A by transforming the initial listing of hash signatures to list the hash identifiers separately, rather than listing an entire hash signature. Accordingly, in one or more embodiments, the dynamic clustering system 112 generates Table A to list multiple columns for a single user identifier, each column including a different hash value.

As further shown in FIG. 6, the dynamic clustering system 112 performs a transformation 602 to generate a Table B. Table B includes two portions each illustrated below column labels ID, Hash Values, and Local-Density Quantile. Similar to the discussion above with regard to Table A, the dynamic clustering system 112 can organize Table B with a column for each hash value corresponding to a user identifier. For example, the first row of Table B includes the user identifier $u_1$, the hash value $b_1(u_1)$, and the local-density quantile 1. As shown in FIG. 6, the dynamic clustering system 112 performs the transformation 602 by determining a range for each of the local-density quantiles corresponding to the user identifiers. More specifically, the dynamic clustering system 112 transforms the local-density quantiles into a listing of smaller or equal local-density quantiles for each user. Thus, dynamic clustering system 112 incorporates these local-density quantile ranges into the Table B.

Additionally, as shown in FIG. 6, the dynamic clustering system 112 joins Table A and Table B utilizing the join operation 604. The dynamic clustering system 112 utilizes the join operation 604 with hash signatures as keys to collect collided user pairings. Additionally, the dynamic clustering system 112 can utilize the local-density quantiles for the join operation 604. More specifically, the dynamic clustering system 112 can utilize the local-density quantiles to join users with greater or approximately equal density in order to determine the nearest local user of higher density. Thus, the dynamic clustering system 112 can utilize the local-density quantiles to join users and hash values from Table A with users and hash values from Table B having either (i) the same local-density quantile and (ii) higher local-density quantiles. By approximating density at the join operation 604, the dynamic clustering system 112 improves efficiency overall by declining to perform a join operation for users that do not have higher density.

Upon performing the join operation, the dynamic clustering system 112 joins users into user pairings, including a queried user and identified users sharing at least one hash partition. As shown as an example—after the join operation 604 in FIG. 6—one user pairing includes user $u_1$ and user $u_2$, while another user pairing includes user $u_1$ and user $u_3$. As further shown in FIG. 6, the dynamic clustering system 112 determines separation distances between users in each user pairing. The dynamic clustering system 112 also identifies the local densities corresponding to the Table A and local densities corresponding to Table B for each user pairing. Similar to discussion above, the join operation 604 can include re-partitioning data to facilitate concurrent task execution.

As also shown in FIG. 6, the dynamic clustering system 112 performs a filter operation 606. As discussed above with regard to FIG. 4B, the dynamic clustering system 112 removes users having lower density than a queried user from consideration as the nearest local user of higher density. In one or more embodiments, the dynamic clustering system 112 utilizes the filter operation 606 to remove user pairings where the identified user has a lower density than the queried user. Though the dynamic clustering system 112 utilizes local-density quantiles in the join operation 604 to improve efficiency, the filter step removes user pairings based on determined local density for improved accuracy. However, the join operation 604 reduces the number of returned user pairings for the filter operation 606 by utilizing the local-density quantiles, which approximate local densities.

The dynamic clustering system 112 utilizes the filter operation 628 to identify such ineligible pairs and remove them from consideration. For example, FIG. 6 shows a lower column where the queried user, $u_1$ from Table A, has a density of 14, while the identified user, $u_3$ from Table B, has a density of 2. Accordingly, the dynamic clustering system 112 can remove the user paring of $u_1$ and $u_3$ from consideration, because $u_3$ cannot be the nearest local neighbor of higher density for $u_1$ due to its lower density. Additionally, similar to discussion above with regard to FIG. 5, in one or more embodiments, the filter operation 606 also removes any duplicate user pairings from consideration for purposes of identifying a nearest local user of higher density for a queried user. Accordingly, the boxes after the filter operation 606 represent the filtered user pairings, where each user pairing comprises the queried user and a user with a higher density than the queried user.

To determine the nearest local user of higher density for a queried user, the dynamic clustering system 112 further utilizes the group-by operation 608. For example, the dynamic clustering system 112 uses user identifiers as the key to aggregate the filtered users by minimum distance. Similar to above discussion, the dynamic clustering system 112 may re-partition during the group-by operation 608 to facilitate concurrent task execution.

After performing the join operation 606, the dynamic clustering system 112 returns a set of remaining identified users that each (1) share at least one hash partition with the queried user and (2) have a local density greater than that of the queried user. Further, the dynamic clustering system 112 groups by minimum distance the remaining identified users. Thus, at the group-by operation 608, the dynamic clustering system 112 identifies the nearest local user of higher density as the identified user with the lowest separation distance. Accordingly, the boxes after the join operation 606 represents the filtered user pairings ordered according to separation distance, where each user pairing comprises the queried user and a user with a higher density than the queried user.

As discussed above, the dynamic clustering system 112 can utilize batch processing to update local densities and separation distances in response to updates to a sparse dataset. To illustrate, the dynamic clustering system 112 can identify an updated sparse dataset of user activities from a new data batch corresponding to the set of users. For example, in some embodiments, the dynamic clustering system 112 identifies an updated sparse dataset by determining that a data-updated set of users was added to the sparse dataset. The dynamic clustering system 112 can determine updated local densities and updated separation distances for the sparse dataset based on the data-updated set of users using batch processing.

As part of updating local densities and separation distances, the dynamic clustering system 112 can separate the data-updated set of users into disjointed subsets of users. Further, the dynamic clustering system 112 implement batch processing in determination of separation distances by replacing Table B with a table including one of the disjointed subsets of users. Accordingly, the dynamic clustering system 112 can determine a nearest local user of higher density from among the data-updated set of users utilizing the filter operation 606 and the group-by operation 608. That is, the dynamic clustering system 112 determines a nearest local user of higher density for a queried user from among a data-updated set of users. Relatedly, the dynamic clustering system 112 determines updated local densities of users neighboring a data-updated user based on shared hash partitions among the disjointed subset of users.

Additionally, the dynamic clustering system 112 compares the nearest local user of higher density from among the data-updated set of users with the existing nearest local user of higher density to determine an updated nearest local user of higher density. Thus, the dynamic clustering system 112 can determine whether the nearest local user of higher density from the data-updated set of users is nearer to the queried user than the nearest local user of higher density among the previously existing data. If the nearest local user of higher density from the data-updated set of users is closer to the queried user, the dynamic clustering system 112 can update the nearest local user of higher density accordingly.

As discussed above, the dynamic clustering system 112 can efficiently allocate hash partitions for parallel processing. However, many datasets include data skew, which can pose a challenge in an operation sequence comprising join, filter, and group-by operations. First, if many users have similar sets of attributes, those users share many common hash partitions. Thus, when the dynamic clustering system 112 performs join operations, some hash partitions will include a disproportionate number of joined intermediate products. Thus, a few tasks will create a bottleneck, requiring much more time than other tasks at this stage. Additionally, after the join operation and the filter operation, some users may have a disproportionate number of candidates for the group-by operation relative to the remainder of the dataset. Therefore, some hash partitions need to accommodate a disproportionately large number of users for comparison and for processing in the group-by operation.

As mentioned briefly above, to address these bottleneck problems, in some embodiments, the dynamic clustering system 112 utilizes a salting technique. More specifically, the dynamic clustering system 112 can modify the join key to redistribute data in an even manner so that parallel instances take roughly the same time. The dynamic clustering system 112 can map a particular hash partition identifier by determining a hash code on a hash key. Additionally, the dynamic clustering system 112 can divide the hash partition by the number of shuffle partitions (i.e., hash partitions generated in a shuffle step) from a corresponding shuffle step.

Figure 7A:
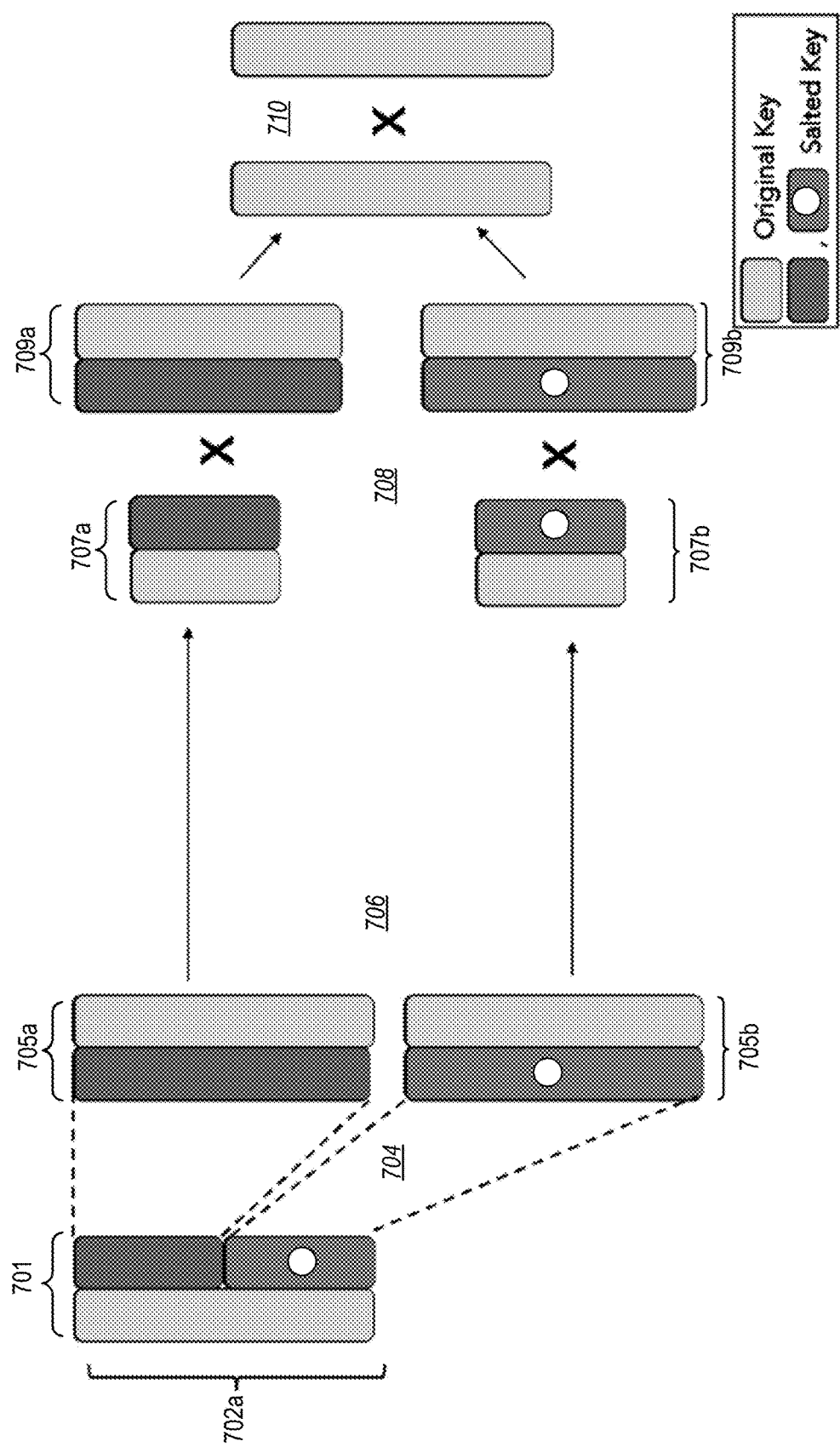
FIGS. 7A-7B illustrate the dynamic clustering system utilizing salting techniques in join operations and group-by operations, respectively, in accordance with one or more embodiments.
Figure 7B:
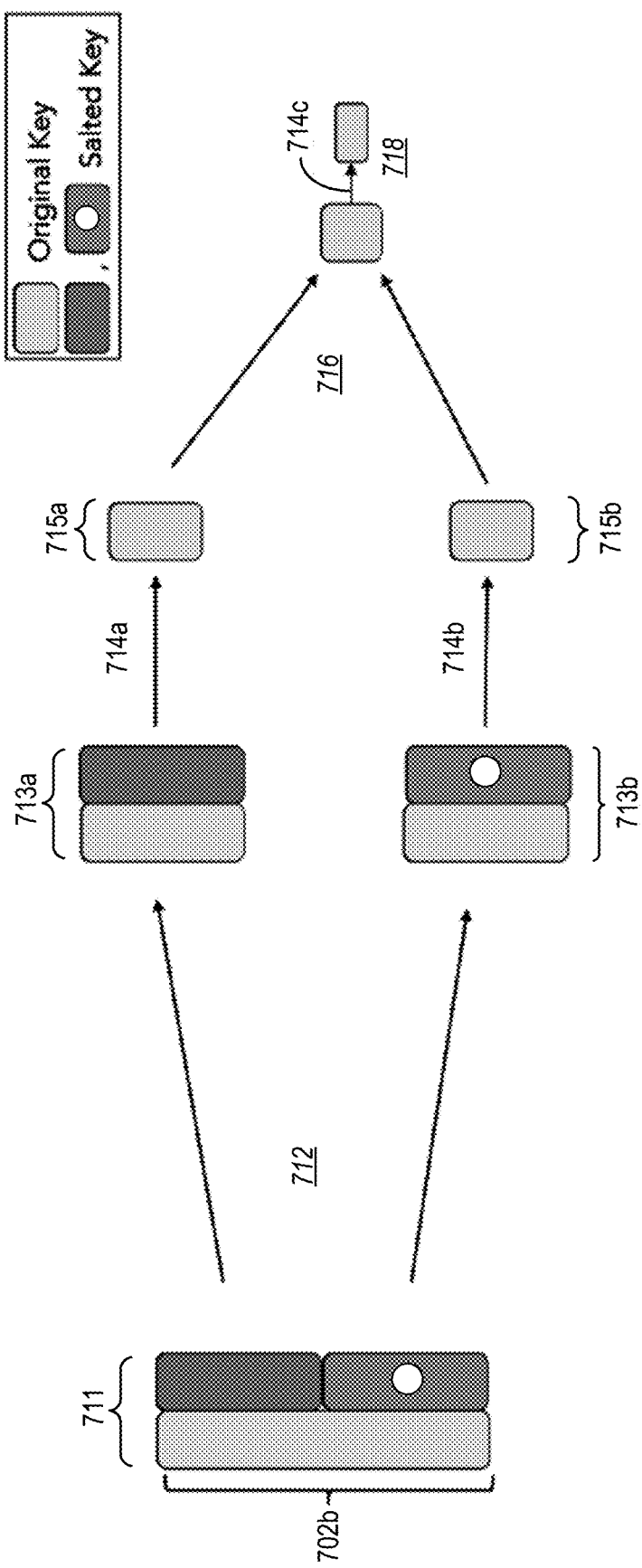

More specifically, in some cases, the dynamic clustering system 112 utilizes a salting technique to change the join or group-by keys to redistribute data among hash partitions evenly. FIGS. 7A-7B illustrate the dynamic clustering system 112 using a salting technique in a join operation and a group-by operation, respectively. FIGS. 7A-7B illustrate columns utilizing an original key in a light shade, salted key columns using a first random key value between zero and a number of replications in a dark shade, and salted key columns using a second random key value between zero and a number of replications with a "dot" symbol.

FIG. 7A illustrates the dynamic clustering system 112 implementing a salting technique in a join operation. As shown in FIG. 7A, the dynamic clustering system 112 begins with a set of data 702a with a same key value. Additionally, the dynamic clustering system 112 performs the act 704 of splitting data by a random key value. This split yields two partitions of the original key.

As further shown in FIG. 7A, the dynamic clustering system 112 organizes the set of data 702a into a table 701. The table 701 includes an original key column shown in the light shade to the left and two salted key columns shown in dark and dark-with-a-dot to the right. The dynamic clustering system 112 performs the act 704 of splitting the table 701 by a random key value. The resulting table 705a includes a salted key column on the left and an original key column shown in a light shade on the right. The second table resulting from the act 704, table 705b, includes a salted key column shown in dark-with-a-dot on the left and an original key column shown in a light shade on the right.

The dynamic clustering system 112 performs the act 706 of transforming the tables 705a, 705b. The act 706 generates the tables 707a and 707b. For example, the dynamic clustering system 112 replicates the data in the table 705a by the number of possible values of the random key value used in act 704. For the table 705a, the dynamic clustering system 112 replicates the data by creating a new key column on the right, where the random key value is between zero and the number of replications. The new key column on the right is shown in table 705a in a darker shade. The replication by the number of possible values of the random key at the table 705a yields the table 707a.

Further, during the act 706, as shown in table 705b to the left of the salted key, the dynamic clustering system 112 adds a new key column with the values between zero and the random key value. This new key column is shown with a white dot in the center. However, the dynamic clustering system 112 does not replicate the table 705b. The transformation adding the new key column at the table 705b yields the table 707b.

The table 707a includes an original key column shown to the left and a salted key column shown to the right, generated based on the table 705a at act 706. The table 707b includes an original key column shown to the left and a salted key column shown to the right, which was generated based on the table 705b at the act 706. The table 709a is a copy of the table 705a, and the table 709b is a copy of the table 705b.

As shown in FIG. 7A, the dynamic clustering system 112 performs the act 708 of joining. More specifically, the dynamic clustering system 112 joins the table 707a with the table 709a and joins the table 707b with the table 709b together using the new key columns and column of hashes together as keys. The dynamic clustering system 112 distributes the rows associated with the original hash values, shown in a light shading, into various hash partitions created from the table replicates. Thus, the dynamic clustering system 112 obtains the same join result 710.

Turning to FIG. 7B, the dynamic clustering system 112 can further apply a salting technique to group-by operations by introducing an additional group-by stage. The dynamic clustering system 112 starts with a set of data 702b with a same key value. Similar to the discussion above with regard to FIG. 7A, the dynamic clustering system 112 adds a new key column with random values to generate a table 711. The table 711 includes the original key column on the left and the two salted key columns shown in dark and dark-with-a-dot to the right.

Further, the dynamic clustering system 112 performs the of implementing a group-by function 712 between the original key column, shown in a light shading, and the randomized key columns, shown in the dark shade and with the white dot. The group-by function 712 yields the tables 713a and 713b. The table 713a includes an original key column on the left and a salted key column on the right. Similarly, the table 713b includes an original key column on the left and a salted key column on the right.

The dynamic clustering system 112 also performs an aggregate function 714a on the table 713b and an aggregate function 714b on the table 713b. When calculating local density, the dynamic clustering system 112 aggregates the groups by count. For separation distance, the dynamic clustering system 112 aggregates the groups by minimum distance. As shown in FIG. 7B, for example, the aggregate functions 714a-714b yield tables 715a, 715b. The tables 715a and 715b include original key columns.

Utilizing the tables 715a and 715b, the dynamic clustering system 112 performs an additional group-by operation 716. More specifically, the dynamic clustering system 112 performs the additional group-by operation 716 utilizing the original key to group data from the tables 715a and 715b. Further, the dynamic clustering system 112 performs an additional aggregate function 714c to determine the same group-by result 718, which is also an original key column. Accordingly, the dynamic clustering system 112 can reduce or eliminate bottlenecking during the join and group-by operations.

As discussed above, in some embodiments, the dynamic clustering system 112 utilizes density peaks clustering. In some embodiments, the dynamic clustering system 112 modifies the density peaks clustering as described by Alex Rodriguez and Alessandro Laio, "Clustering by Fast Search and Find of Density Peaks," Science (2014), the entire contents of which are incorporated by reference.

Figure 8:
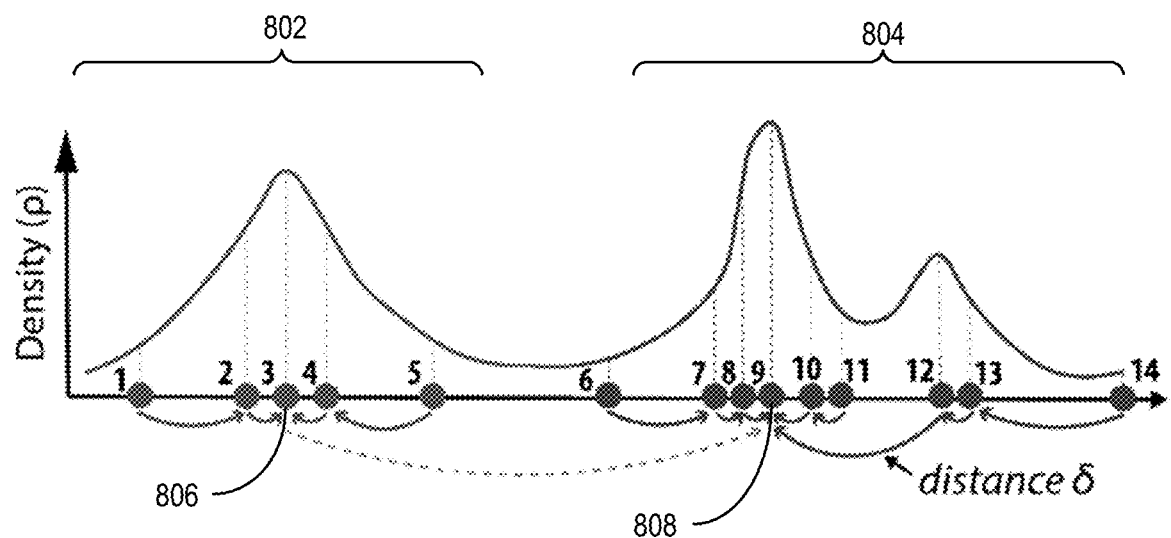
FIG. 8 illustrates the dynamic clustering system performing a sparse-density-peaks algorithm on a dataset in accordance with one or more embodiments.
Figure 8:
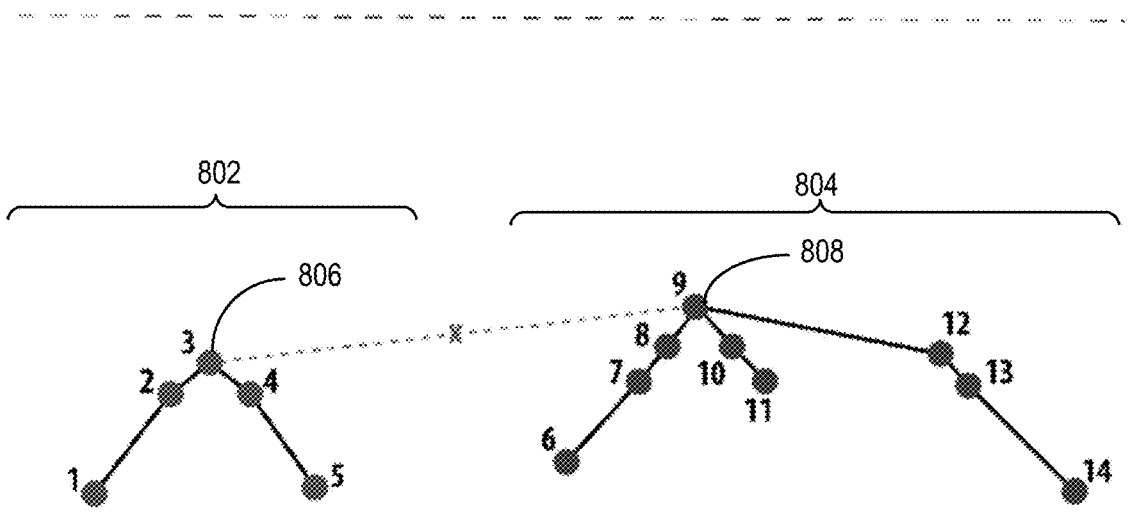

FIG. 8 illustrates the dynamic clustering system 112 utilizing a density-peaks-clustering algorithm to segment users or other represented data points using hash-partition-based local densities and separation distances. By using such has-partition-based local densities and separation distances to cluster users or other data points, the dynamic clustering system 112 performs a type of sparse-density-peaks-clustering algorithm. When implementing such a sparse-density-peaks-clustering algorithm, the dynamic clustering system 112 assumes that data points representing cluster centers are often surrounded by neighboring data points with lower local densities. The dynamic clustering system 112 further assumes that data points representing cluster centers are relatively more distant to any other data points. For example, as FIG. 8 illustrates, the dynamic clustering system 112 clusters each data point into a same cluster label as the data point's nearest neighbor of higher density.

FIG. 8 illustrates the segments 802 and 804 both in one dimension and constructed by attaching data points. Segment 802 includes a data point of highest density within the segment 802 as a segment center 806. Similarly, segment 804 includes a data point of highest density within the segment 804 as a segment center 808. By performing a sparse-density-peaks-clustering algorithm, as shown in FIG. 8, the dynamic clustering system 112 generates segments comprising hierarchal clustering. For example, the dynamic clustering system 112 clusters each point to the same segment as its nearest neighbor in descending order of density. The parent node of a data point is its nearest neighbor and all child nodes under a parent have the same segment label.

When applying a density-peaks-clustering algorithm, the dynamic clustering system 112 can determine a density $\rho_i$ of a data point $u_i$, where $d_c$ represents a separation-distance threshold and $u_j$ represents another data point considered with regard to the data point $u_i$.

$$\rho_i = |\{u_j | \text{dist}(u_i, u_j) < d_c\}| \quad (5)$$

Further, the dynamic clustering system 112 can determine a minimum distance $\delta_i$ to a data point of higher density, where $\rho_j$ represents the local density of the user $u_j$, as follows:

$$\delta_i = \min_{j:\rho_i<\rho_j} dist(u_i, u_j) \quad (6)$$

In function (6), $\rho_i$ must be less than $\rho_j$ in order for $u_j$ to constitute a data point of higher density. In one or more embodiments, the dynamic clustering system 112 assigns the point with the highest density as the maximum value of $\delta$. The dynamic clustering system 112 utilizes these assumptions to label point with anomalously high $\delta_i$ and $\rho_i$ as segment centers. For example, in FIG. 8, the dynamic clustering system 112 identifies the segment centers 806 and 808 by identifying anomalously large $\delta_i$ and $\rho_i$.

As shown in the below algorithms, the dynamic clustering system 112 can apply a density-peaks-clustering algorithm to (i) determine a local density for a data point using Algorithm 1, (ii) determine a minimum distance of a data point to a data point of higher density using Algorithm 2, and (iii) assign a data point to a segment using Algorithm 3. After setting forth Algorithms 1, 2, and 3, the disclosure describes how to modify Algorithms 1 and 2 to perform a sparse-density-peaks-clustering algorithm below.

---

ALGORITHM 1

1: procedure calculateLocalDensity(distance, $d_c$)
2:   for i = 1 : n do
3:     $\rho_i = 0$
4:     for j = 1 : n do
5:       if i ≠ j and distance(i, j) ≤ $d_c$ then
6:         $\rho_i = \rho_i + 1$
7:   return $\rho$

---

ALGORITHM 2

1: procedure calculateLocalDensity(distance, $d_c$)
2:   for i = 1 : n do
3:     $\delta_i = \infty$
4:     $nn_i$ = null
5:     for j = 1 : n do
6:       if i ≠ j and $\rho_i < \rho_j$ and $\delta_i >$ distance(i, j) then
7:         $\delta_i$ = distance(i, j)
8:         $nn_i$ = j
9:   return n, $\delta$

---

ALGORITHM 3

Input: X (segment centers), nn (list of nearest higher density neighbor), sortedIndex (list of indexes sorted by $\rho$)
Output: C (list of cluster labels)
1: for i = 1: size(X) do
2:   C(X(i)) = i
3: for i = 1 : size(sortedIndex) do
4:   if C(sortedIndex(i)) == empty then
5:     C(sortedIndex(i)) = C (nn(sortedIndex(i)))

---

As discussed above, the dynamic clustering system 112 utilizes a sparse-density-peaks-clustering algorithm in conjunction with batch processing. Instead of identifying the density peaks in a single run, the dynamic clustering system 112 can run the sparse-density-peaks-clustering algorithm in an anytime manner by processing the dataset without interruptions. For example, in some embodiments, the dynamic clustering system 112 modifies a density-peaks-clustering algorithm as described by James Hendler, "Artificial intelligence planning systems," *Proceedings of the first International Conference College Park, Maryland* (1992), the entire contents of which are incorporated by reference.

As suggested above, in some embodiments, the dynamic clustering system 112 modifies Algorithm 1 to determine a local density for a user or other represented data point. As discussed above, the dynamic clustering system 112 can identify users and/or multi-dimensional data points for consideration with regard to local density by identifying users with a threshold number of shared hash partitions with a queried user. The dynamic clustering system 112 can implement this modification by replacing the loop in line four of Algorithm 1 with the identified users having the threshold number of shared hash partitions with the queried user. Additionally, as discussed above, the dynamic clustering system 112 utilizes the functions (2) and (3) to determine local densities for queried users. By limiting a local-density determination for a queried user to neighboring users sharing a threshold number of hash partitions, the dynamic clustering system 112 greatly improves the efficiency Algorithm 1 while generating resulting local densities of comparable accuracy.

Additionally, in some embodiments, the dynamic clustering system 112 modifies Algorithm 2 to determine a minimum distance of a data point to a data point of higher density. As discussed above, the dynamic clustering system 112 can identify users and/or multi-dimensional data points for consideration with regard to the nearest local user of higher density for queried point based on sharing at least one hash partition. To implement this modification, the dynamic clustering system 112 can replace line five in Algorithm 2 with the users identified as sharing at least one hash partition with the queried user. Additionally, as discussed above, the dynamic clustering system 112 utilizes the function (4) to determine nearest local users of higher density for queried users. By limiting a separation-distance determination for a queried user to users sharing at least one hash partition, the dynamic clustering system 112 can utilize the sparse-density-peaks-clustering algorithm to improve the efficiency and flexibility of determining a nearest local user of higher density for a queried user.

Given a sparse dataset, the dynamic clustering system 112 does not need to compute the entire dataset to compute local density and separation distances for each data point. Instead, the dynamic clustering system 112 can split the sparse dataset into multiple disjoint subsets and compare it with each subset one by one. To illustrate, after t-th batches of subsets, data point $\rho_i$ obtains a density $\rho_i$. Where U represents a dataset or a set of data points, when the (t+1)-th batch $U_{t+1}$ comes, the dynamic clustering system 112 can update the density as follows:

$$\rho_{i_{t+1}} = \rho_{i_t} + |\{u_j | dist(u_i, u_j) < d_c \forall u_j \in U_{t+1}\}| \quad (7)$$

Additionally, the dynamic clustering system 112 can update separation distances by splitting the sparse dataset into multiple disjoint subsets and compare it with each subset one by one. To illustrate, the dynamic clustering system 112 can determine an updated local density of users neighboring a data-updated set of users from the updated dataset. The dynamic clustering system 112 can determine the updated local density corresponding to a user based on shared hash partitions among the disjointed subset of users. The dynamic clustering system 112 computes separation distances batch-by-batch similarly to computation of density. For example, after t-th batches of subsets, a data point $\rho_i$ obtains a separation distance $\delta_i$. When the (t+1)-th batch $U_{t+1}$ comes, the dynamic clustering system 112 updates the distance as follows:

$$\delta_{i_{t+1}} = \min\left(\delta_{i_t}, \min_{j:\rho_i<\rho_j \forall j\in U_{t+1}} dist(u_i, u_j)\right) \quad (8)$$

The dynamic clustering system 112 utilizes function (8) to determine updated separation distances. For example, the dynamic clustering system 112 can utilize function (8) to determine an updated separation distance of a data-updated user to a nearest local user of higher density. Based updated separation distances, the dynamic clustering system 112 can determine updated nearest local users of higher density.

Each of these updates allow the dynamic clustering system 112 to schedule pre-processing. For example, the dynamic clustering system 112 can stop the density-peaks-clustering algorithm when other tasks require large resources, and resume when more resources are available. This flexibility allows the dynamic clustering system 112 to allocate tasks more efficiently. Further, the dynamic clustering system 112 determines comparisons between a subset and a whole dataset at a time, which drastically reduces the number of intermediate results used in the determinations. This reduces memory usage, which can provide room for various efficiency strategies described above with regard to FIGS. 4A-4B, 5-6.

Figure 9A:
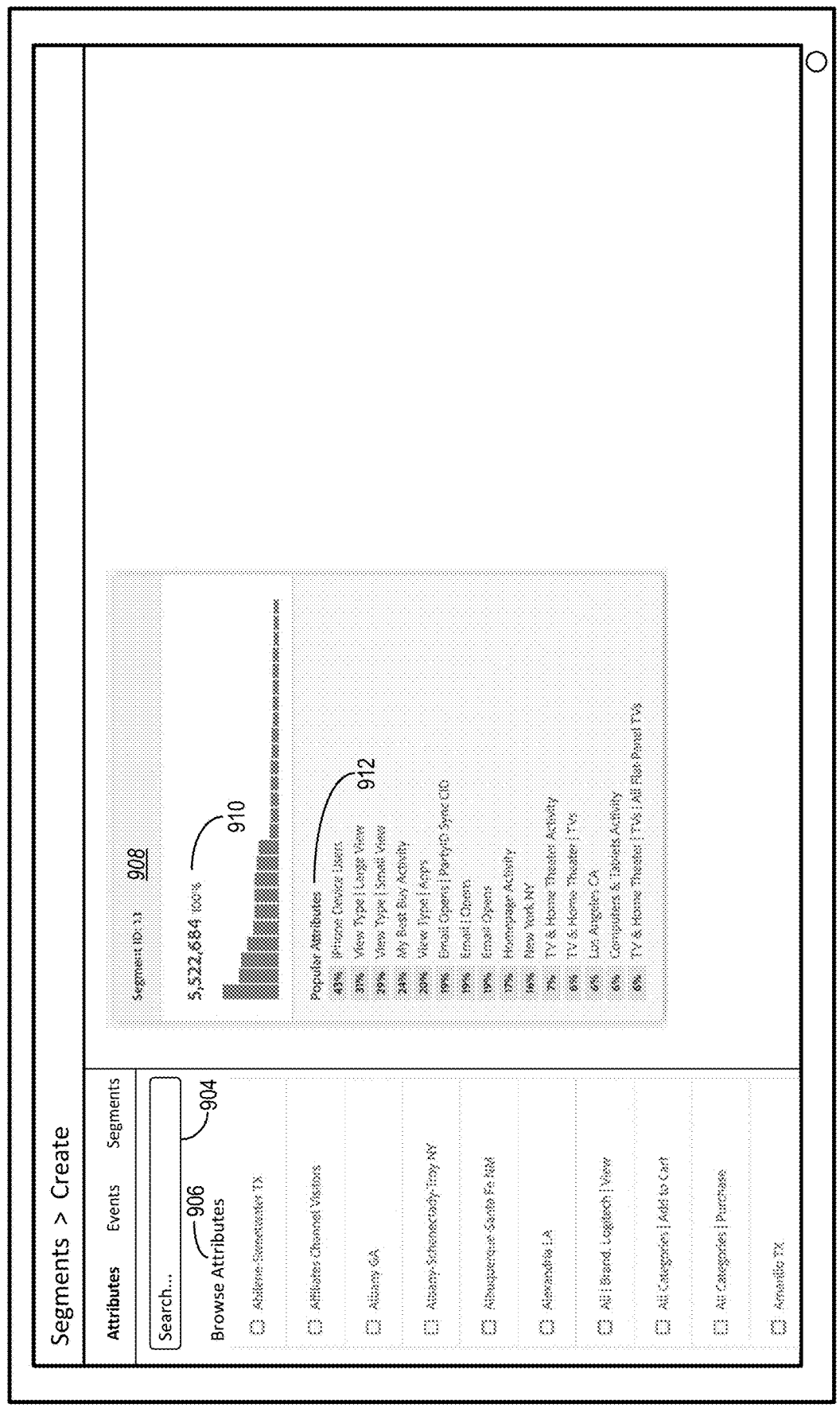
FIG. 9A illustrates an example graphical user interface for exploring user segments in accordance with one or more embodiments.
Figure 9B:
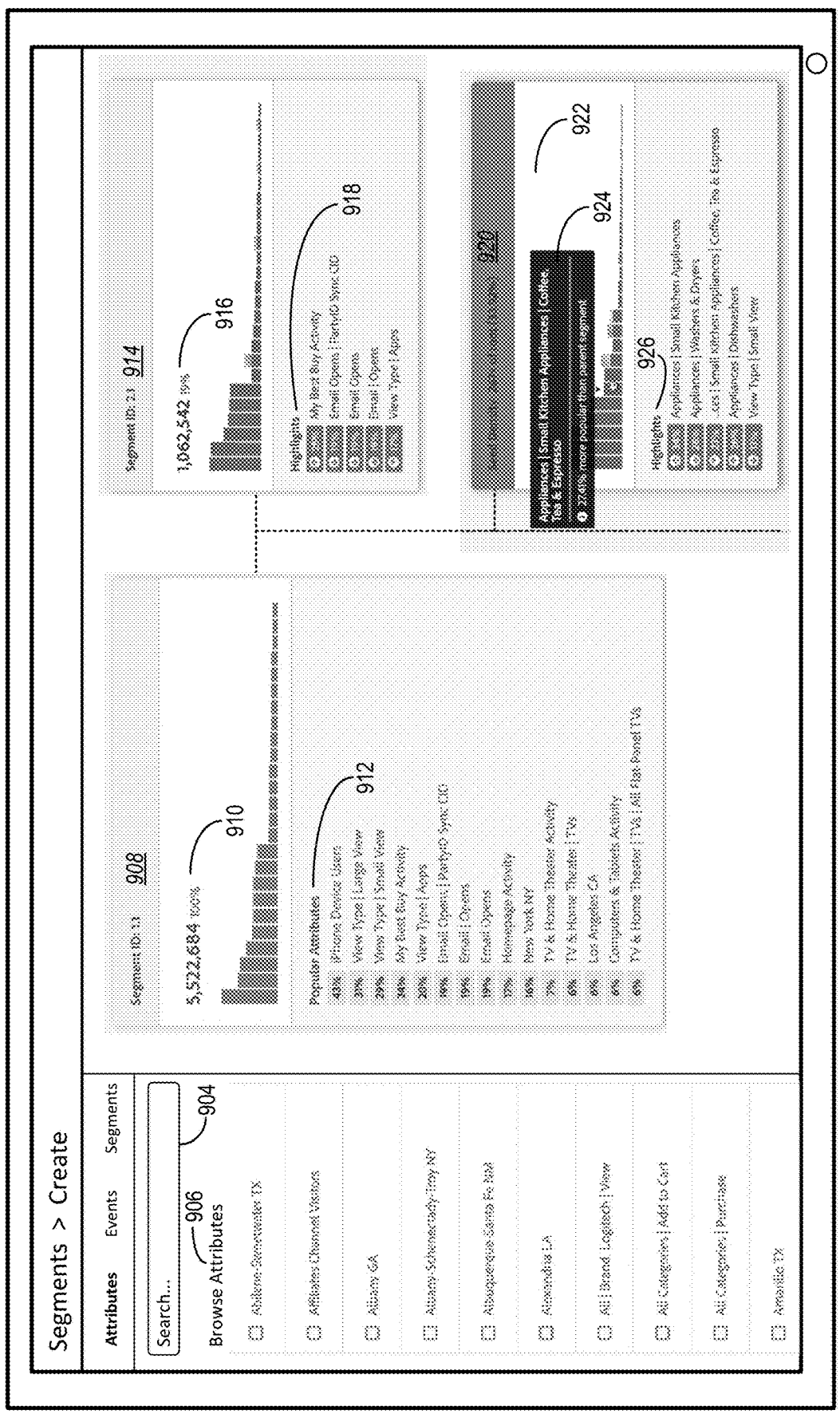
FIG. 9B illustrates an example graphical user interface for splitting user segments into subsegments in accordance with one or more embodiments.
Figure 9C:
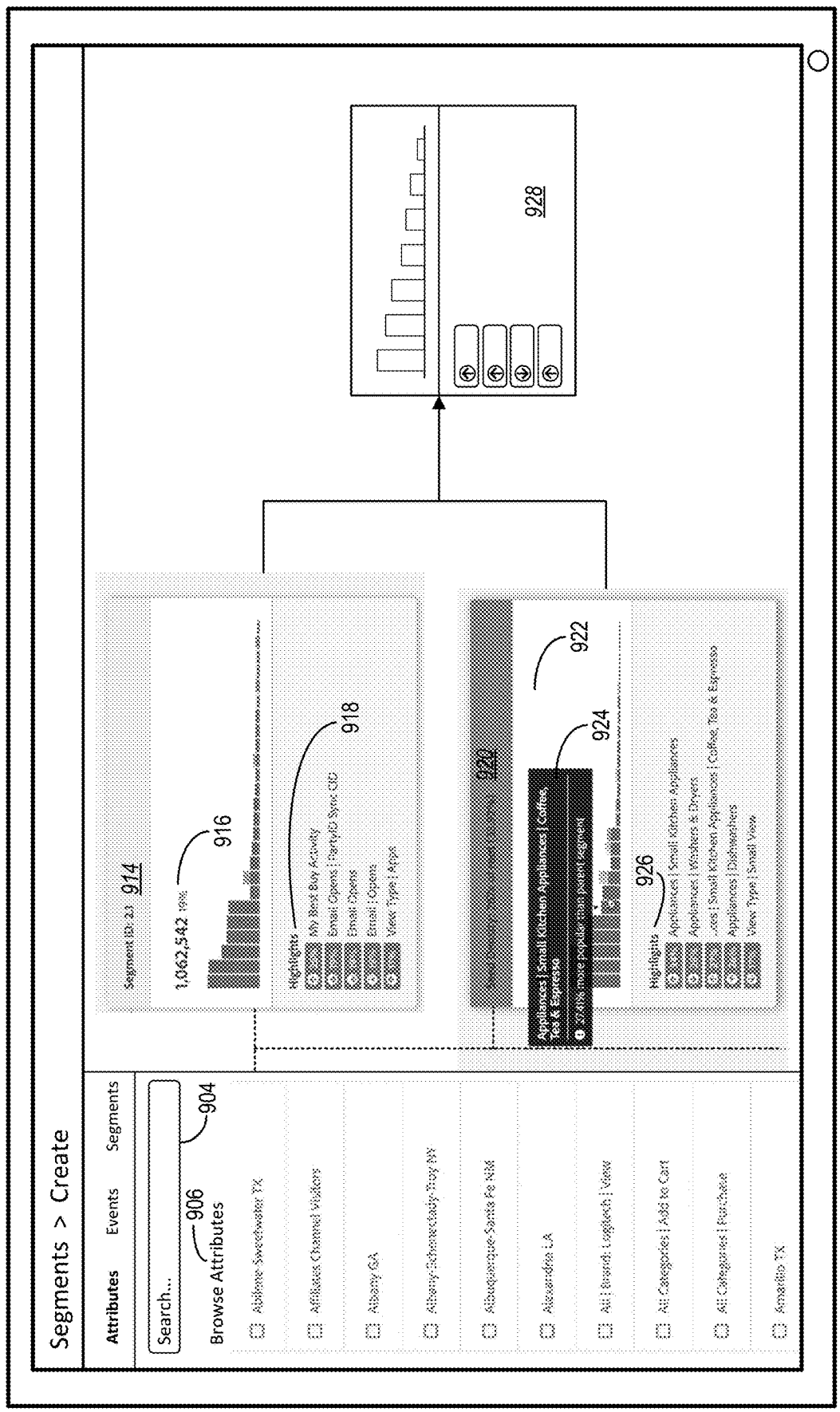
FIG. 9C illustrates an example graphical user interface for combining user segments in accordance with one or more embodiments.

As discussed above, the dynamic clustering system 112 can provide real-time clustering and sub-clustering for a sparse dataset in response to user selection via a graphical user interface. FIGS. 9A-9C illustrate an example graphical user interface presented by a computing device 900 for dynamic clustering and exploration of clusters. For example, in some embodiments, the computing device 900 represents the administrator device 104 in FIG. 1. The dynamic clustering system 112 can provide data to the computing device 900 to present the graphical user interfaces depicted in FIGS. 9A-9C. Additionally, though FIGS. 9A-9C illustrate example graphical user interfaces with example designs, the dynamic clustering system 112 can provide data for graphical user interfaces in accordance with a variety of visual designs.

As shown in FIG. 9A, the dynamic clustering system 112 can provide, and the computing device 900 can present, various options and information concerning a sparse dataset for display within a graphical user interface. For example, the computing device 900 can present the clustering-information bar 902 for display. In one or more embodiments, the clustering-information bar 902 includes a search bar 904 and a browse area 906. FIG. 9A illustrates the clustering-information bar 902 as including tabs for attributes, events, and segments. In one or more embodiments, the dynamic clustering system 112 can receive from a user device user input based on a user interacting with these tabs. In response to receiving user interaction selecting a tab, the dynamic clustering system 112 can modify the clustering-information bar 902 to accommodate searches and browsing for the corresponding tab. Though FIG. 9A illustrates the clustering-information bar 902 as including tabs for attributes, events, and segments, the dynamic clustering system 112 can provide the clustering-information bar 902 including a tab for locations, behavior, activity, or a variety of other categories relevant to a sparse dataset.

As further shown in FIG. 9A, in some embodiments, the clustering-information bar 902 includes a search bar 904. In one or more embodiments, the computing device 900 detects user queries based on user interaction with the search bar 904. The computing device 900 can send these queries to the dynamic clustering system 112. In response to user queries, the dynamic clustering system 112 provides relevant clustering criteria and/or information to the computing device 900 for presentation via the graphical user interface. For example, in response to receiving a user query "appliance" from the computing device 900, the dynamic clustering system 112 can provide user categories relevant to appliances in the browse area 906 to the computing device 900 for presentation. Accordingly, the dynamic clustering system 112 provides a dynamic experience for exploring sparse datasets via clustering.

The clustering-information bar 902 can also include the browse area 906. As mentioned above, in some embodiments, the dynamic clustering system 112 provides relevant categories or information from a sparse dataset for presentation by the computing device 900 via the browse area 906. The computing device 900 can present content in the browse area 906 based on user search and/or based on user selection of a tab.

For example, as shown in FIG. 9A, the clustering-information bar 902 shows an attributes tab selected. Accordingly, the computing device 900 presents a "Browse Attributes" label at the browse area 906. Further, the computing device 900 presents interactable user attribute categories at the browse area 906. In response to detecting user interaction at a category, the computing device 900 can present user segments and/or sub-segments with labels corresponding to the selected category. For example, as described with regard to FIG. 9B, the computing device 900 can present headings or other visual cues drawing attention to segments having a higher concentration of a particular user attribute corresponding to the selected category.

FIG. 9A also illustrates a dataset-display area 908. The dataset-display area 908 provides information about an example sparse dataset. As shown in FIG. 9A, the dataset-display area 908 includes a chart area 910 and an attribute area 912. In FIG. 9A, the computing device 900 presents dataset-display area 908 with the label "Segment ID 1.1," but the computing device 900 can present a variety of labels for a sparse dataset and/or any corresponding clusters or sub-clusters.

As further shown in FIG. 9A, the dataset-display area 908 includes the chart area 910. The chart area 910 includes information about the number of users in the displayed segment. For example, as the dataset-display area 908 corresponds to the entire sparse dataset, the computing device 900 presents the total number of users in the sparse dataset, 5,522,684, via the chart area 910. Further, the computing device 900 can present the percentage of the total sparse dataset via the chart area 910. As the dataset-display area 908 depicts a segment that corresponds to the entire sparse dataset, this percentage is 100%.

Additionally, the chart area 910 includes a bar graph reflecting portions of the sparse dataset with particular user attributes. In some embodiments, the computing device 900 presents these attribute bars in the same order as the listing in the attribute area 912. Accordingly, the computing device 900 presents a visual representation of these user attributes for a more comprehensive user experience. Additionally, as described below with regard to FIG. 9B, in one or more embodiments, the dynamic clustering system 112 can provide, and the computing device 900 can present, additional information corresponding to a particular bar based on receiving an indication of user interaction from a computing device at that bar.

As further shown in FIG. 9A, the dataset-display area 908 can include an attributes area 912. The attributes area 912 includes a listing, in descending order of popularity, attributes of the sparse dataset. Further, the attributes area 912 includes percentages reflecting how common an attribute is in the sparse dataset. Attributes areas corresponding to segments or sub-segments can include attributes and corresponding percentages based on the prevalence of attributes in the segments or sub-segments.

In response to receiving, from the computing device 900, an indication of user interaction at a listed attribute within the attributes area 912, the dynamic clustering system 112 can provide data for modification of the presentation of the bar in the chart area 910 corresponding to the selected attribute. More specifically, in one or more embodiments, the dynamic clustering system 112 provides data for the modification of the corresponding bar for increased visibility. For example, the computing device 900, based on received data, can modify the color, shading, or outline of the bar to indicate that it corresponds to the selected attribute in the attributes area 912.

As discussed above, the dynamic clustering system 112 can receive, from the computing device 900, an indication of user selection of attributes at the browse area 906, the chart area 910, and/or the attributes area 912. In some embodiments, in response to receiving user selection of an attribute, the dynamic clustering system 112 can provide data for segments and/or sub-segments of users from the sparse dataset. Further, the dynamic clustering system 112 can provide data for highlighting segments and/or sub-segments within the graphical user interface that have particular relevance to the selected attribute. FIG. 9B illustrates the computing device 900 presenting visual representations of segments of users from the sparse dataset in response to user selection of the attribute "Appliances."

FIG. 9B shows a segment display area 914. The segment display area 914 includes a chart area 916 and a featured-attributes area 918. Similar to the dataset-display area 908, the segment display area 914 includes information relevant to its corresponding segment. As the segment corresponding to the segment display area 914 is not of particular relevance to the selected attribute "Appliances," the computing device 900 presents the segment display area 914 without visual modification to not draw attention to the segment display area 914.

The dynamic clustering system 112 can provide, and the computing device 900 can present, information corresponding to user segments of a dataset in various segment display areas. Similarly, in one or more embodiments, the dynamic clustering system 112 provides, and the computing device 900 presents, information corresponding to user subsegments based on further segmentation of a user segment. In some embodiments, the dynamic clustering system 112 determines subsegments of users based on further segmentation of a segment of users. The dynamic clustering system 112 can utilize the determined local densities and separation distances corresponding to users in a segment to determine such subsegments. Further, the dynamic clustering system 112 can provide data for, and the computing device 900 can present, a subsegment display area including a chart area, featured-attributes area, and various other information corresponding to the subsegment.

As shown in FIG. 9B, the chart area 916 includes a user count of 1,062,542 users, accounting for approximately 19% of users from the sparse dataset. Further, the bars in the chart area 916 correspond to user attributes of users in the corresponding segment. Additionally, as shown in FIG. 9A, the chart area 916 includes bars with a shaded portion. In one or more embodiments, the computing device 900 presents a shaded portion corresponding to a bar reflecting the size of that bar in the total sparse dataset. Thus, the computing device 900 presents an easily understandable visual reference for attributes that are less represented in a segment or sub-segment relative to the total sparse dataset.

As indicated above, FIG. 9B also illustrates the featured-attributes area 918. More specifically, the computing device 900 presents attributes of particular deviation from the total sparse dataset. Further, the featured-attributes area 918 can include percentage growth or decrease of the featured attributes. As shown in FIG. 9B, the computing device 900 can present an arrow icon corresponding to either the relative higher or lower attribute (in terms of percentage) for ease of understanding.

Additionally, the computing device 900 can present a segment display area 920 for display within a graphical user interface. The segment display area 920 corresponds to a user segment with significantly higher relevance to the user attribute "Appliances" than the total sparse dataset. That is, the users in the segment corresponding to the segment display area 920 have more user attributes and/or user behaviors related to appliances than the total sparse dataset.

The computing device 900 shades, highlights, or otherwise visually indicates the segment display area 920 and labels its higher seed density based on the user selection of the attribute "Appliances." As shown in FIG. 9B, the seed density of the segment is 267 times that of the sparse dataset as a whole. In one or more embodiments, the computing device 900 modifies the color, font, size, or other visual attributes of the segment display area 920 to bring visual attention. The dynamic clustering system 112 further provides a chart area 922 and featured-attributes area 926 within the segment display area 920. Similar to discussion above, the computing device 900 utilizes these areas to provide users with easily understandable information about the segment.

Additionally, as discussed above, the dynamic clustering system 112 can provide data for additional information about an attribute in response to receiving, from the computing device 900, an indication of user interaction (e.g., a mouse hover) at a bar corresponding to the attribute. Further, the computing device 900 can present the additional information about the attribute. As shown in FIG. 9B, the computing device 900 can present an additional-information panel 924 in response to detecting an indication of this user interaction. The additional-information panel 924 includes the full title of the user attribute. Further, the additional-information panel 924 includes information about the attribute relative to the parent segment. For example, in FIG. 9B, the additional-information panel 924 includes the text "27.41% more popular than the parent segment." Accordingly, the computing device 900 can present information in conjunction with the chart area 922.

In addition to segmenting users from a sparse dataset, the dynamic clustering system 112 can also combine a set of segments. For example, as shown in FIG. 9C, the dynamic clustering system 112 can generate a combined segment. Additionally, the computing device 900 can present the combined segment display area 928 corresponding to the combined segment. FIG. 9C illustrates a graphical user interface depicting the segment display area 928 resulting from the combination of two users segments to generate a combined segment—based on receiving an indication of user selection of two segments from the computing device 900. While FIG. 9C depicts combining two segments, the dynamic clustering system 112 can combine a variety of numbers of user segments into a combined segment.

To generate a combined segment, the dynamic clustering system 112 generates a segment including each user included in each segment selected for combination. Additionally, the computing device 900 can present a display area for the combined segment within the same graphical user interface based on data about the combined segment received from the dynamic clustering system 112. For example, the combined segment display area 928 can include a chart area and a featured-attributes area. Accordingly, similar to the discussion above with regard to FIG. 9B, the computing device 900 can present information via a combined segment display area for easy interpretation by the user.

As suggested above, the dynamic clustering system 112 efficiently clusters datasets into segments while maintaining accuracy. For example, in some cases, the dynamic clustering system 112 demonstrates an accuracy of clustering datasets into segments comparable to (or better than) state-of-the-art clustering algorithms—while still demonstrating more efficiency and flexibility than conventional systems. As shown in Tables 1, 2, and 3 below, the dynamic clustering system 112 demonstrates comparable or better accuracy at clustering datasets into segments as measured in terms of (1) Jaccard distance, (2) L1 or Manhattan distance, or (3) L2 or Euclidean distance. While demonstrating comparable or better accuracy, the dynamic clustering system 112 can cluster datasets in real-time with lower processing costs than such systems.

In particular, Tables 1, 2, and 3 below compare the error rate of clustering three datasets between dynamic clustering system 112 using a sparse-density-peaks-clustering algorithm, on the one hand, and density peaks clustering, K medoid clustering, K means clustering, and hierarchal clustering, on the other hand. Tables 1, 2, and 3 compare the error rate of the dynamic clustering system 112 both with and without the correction mechanisms for false positives or false negatives described above. For ease of reference, Tables 1, 2, and 3 use the term "dynamic clustering" to refer to the dynamic clustering system 112 using the sparse-density-peaks-clustering algorithm described above.

For evaluating scalability, Tables 1, 2, and 3 reflect evaluation based on two sparse datasets. The first dataset includes 3,019,354 users with 49,677 unique user attributes. The second dataset includes 1,407,580 visitors with 270,766 unique user attributes. For evaluating segmentation quality, Tables 1, 2, and 3 reflect evaluation based on an additional three sparse datasets with ground truth category labelling. The first dataset includes 7,095 documents and 6,134 unique words with four document categories. The second dataset includes 947 users with 13413 unique user attributes and thirteen categories. The third dataset includes 1,000 users with 4,465 unique user ratings on 1,700 rated pieces of media and eighteen categories.

As suggested above, the dynamic clustering system 112 utilizes MinHash in conjunction with LSH, which offers improved speed over other combinations. For example, in a comparison of processing a 1.4 million user sparse dataset, the dynamic clustering system 112 expedites clustering 5.88 times by using (a) sparse-density-peaks clustering without correction utilizing MinHash and LSH relative to (b) sparse-density-peaks clustering without correction utilizing a machine learning library (Spark MLib LSH library) and LSH. Additionally, the dynamic clustering system 112 expedites clustering by using sparse-density-peaks clustering without correction utilizing MinHash and LSH with a 9.69 times speedup relative to clustering utilizing VeronicaJoin and with a 2.83 times speedup relative to MRGroupJoin. Further, by using sparse-density-peaks clustering without correction utilizing MinHash and LSH, the dynamic clustering system 112 expedites clustering 19.6 times over AllPairs hierarchal clustering. These results demonstrate that MinHash in conjunction with LSH provide significant advantages for the dynamic clustering system 112.

TABLE 1

| Dataset | dynamic clustering | dynamic clustering (no correction) | Jaccard Distance | | |
| --- | --- | --- | --- | --- | --- |
| | | | density peaks alone | K Medoid | Hierarchal |
| Set 1 | 0.81 | 0.71 | 0.83 | 0.82 | 0.82 |
| Set 2 | 0.71 | 0.69 | 0.71 | 0.71 | 0.68 |
| Set 3 | 0.72 | 0.65 | 0.72 | 0.56 | 0.62 |

TABLE 2

| Dataset | dynamic clustering | dynamic clustering (no correction) | L1 (Manhattan) Distance | | |
| --- | --- | --- | --- | --- | --- |
| | | | density peaks alone | K Means | Hierarchal |
| Set 1 | 0.81 | 0.71 | 0.63 | 0.71 | 0.78 |
| Set 2 | 0.71 | 0.69 | 0.57 | 0.65 | 0.63 |
| Set 3 | 0.72 | 0.65 | 0.57 | 0.45 | 0.45 |

TABLE 3

| Dataset | dynamic clustering | dynamic clustering (no correction) | L2 (Euclidean) Distance | | |
| --- | --- | --- | --- | --- | --- |
| | | | density peaks alone | K means | Hierarchal |
| Set 1 | 0.81 | 0.71 | 0.77 | 0.71 | 0.77 |
| Set 2 | 0.71 | 0.69 | 0.57 | 0.52 | 0.55 |
| Set 3 | 0.72 | 0.65 | 0.55 | 0.55 | 0.42 |

Figure 10A:
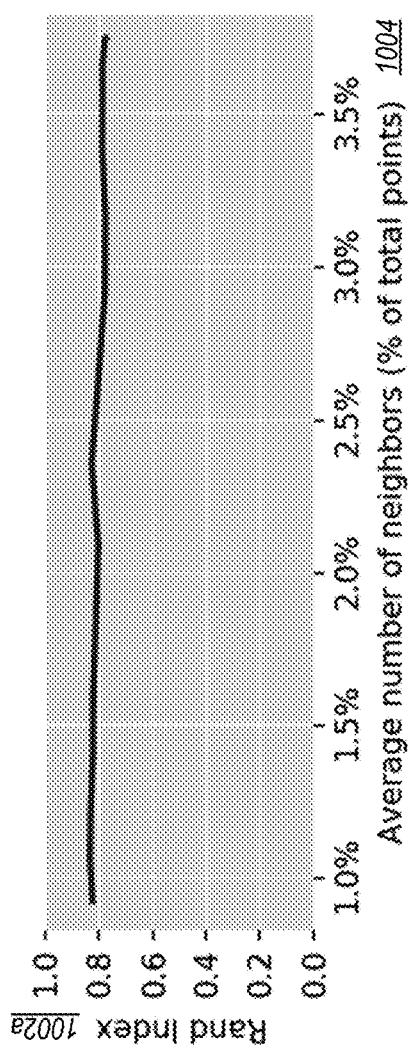
FIGS. 10A-10B illustrates graphs depicting the effect of the dynamic clustering system using a separation-distance threshold and threshold number of hash partitions on accuracy in accordance with one or more embodiments.
Figure 10B:
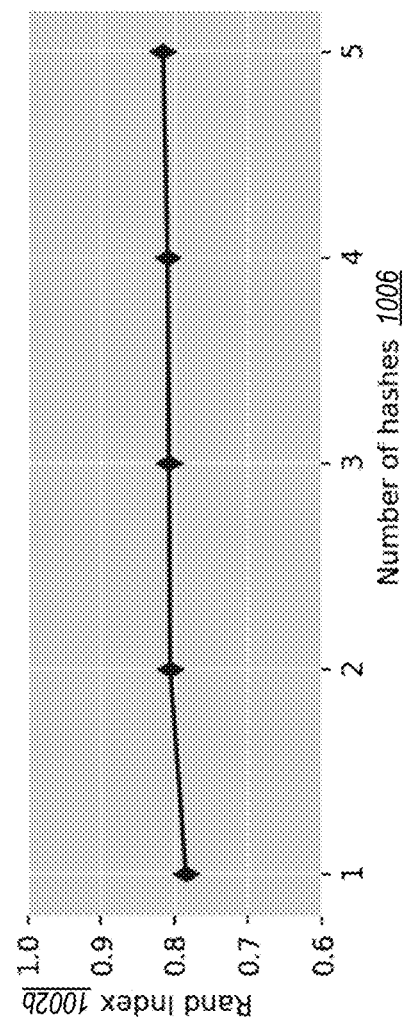

Relatedly, FIGS. 10A-10B depict an error rate for the dynamic clustering system 112 clustering datasets into segments in terms of a Rand Index. As indicated by FIGS. 10A-10B, a user's parameter choices for a separation-distance threshold or number of shared hash partitions does not affect the error rate of the dynamic clustering system 112. For example, FIG. 10A illustrates the accuracy of the dynamic clustering system 112 over a variety of separation-distance thresholds for the dataset of 7,095 documents and 6,134 unique words with four document categories.

In particular, FIG. 10A includes a y-axis 1002a showing a Rand Index and an x-axis 1004 showing a corresponding average number of neighbors as a percentage of total points. More specifically, FIG. 10A illustrates results from the dynamic clustering system 112 clustering a dataset into four clusters with various separation-distance thresholds. FIG. 10A illustrates a measured Rand-Index value corresponding to an iteration for each separation-distance threshold. Additionally, FIG. 10A illustrates a measured average number of neighbors as a percentage of total points in the dataset at an iteration corresponding to each separation-distance threshold. FIG. 10A further shows these values graphed against one another and demonstrates that the separation-distance threshold has a wide variety of appropriate choices with comparable accuracy. The x-axis 1004 shows an average number of neighbors was obtained as a percentage of total points in the dataset utilizing the different separation-distance thresholds.

As shown in FIG. 10A, the Rand Index remains essentially stable across the average number of neighbors. Accordingly, regardless of the separation-distance threshold that the dynamic clustering system 112 utilizes to determine local densities, the accuracy remains stable. That is, the dynamic clustering system 112 can provide accurate local densities utilizing a variety of separation-distance thresholds.

Further, FIG. 10B illustrates that the dynamic clustering system 112 can generate accurate segments from a dataset utilizing a variety of threshold numbers of shared hash partitions. More specifically, FIG. 10B illustrates results from the dynamic clustering system 112 clustering a dataset utilizing a variety of variety of threshold numbers of partitions for determining local densities. Like FIG. 10A, FIG. 10B illustrates a y-axis 1002b indicating a Rand Index value corresponding to an iteration for each threshold number of hash partitions along an x-axis 1006. The x-axis 1006 shows the threshold numbers shared of hash partitions as a number of hashes.

FIG. 10B illustrates these values graphed against one another, demonstrating an approximate consistency in accuracy across a variety of threshold numbers of shared hash partitions. As FIG. 10B demonstrates, the dynamic clustering system 112 can provide accurate local densities utilizing a variety of threshold numbers of shared hash partitions. Thus, FIGS. 10A-10B show that the dynamic clustering system 112 can provide accurate clustering utilizing a variety of different parameters.

As noted above, clustering datasets into segments can consume significant memory on a computing device. The dynamic clustering system 112 consumes less memory linearly for distance computations utilizing various numbers of hash partitions for mapping users. When the dynamic clustering system 112 performs an example distance computation for a sparse dataset of three million users, for example, the dynamic clustering system 112 requires approximately 300 GB of memory for two hash partitions, approximately 600 GB for four hash partitions, and approximately 850 GB for six hash partitions. On the other hand, the time requirements of the dynamic clustering system 112 utilizing various numbers of hash partitions scales more drastically. For the same three million user dataset, the distance computation required approximately ten minutes for two hash partitions, approximately seventeen minutes for four hash partitions, and approximately 35 minutes for six hash partitions.

The dynamic clustering system 112 consumes more time and memory consumption for density computations utilizing more hash partitions, with the increased consumption scaling linearly. For the example, for a dataset of three million users, the dynamic clustering system 112 used approximately 50 GB for two hash partitions, approximately 100 GB for four hash partitions, approximately 175 GB for 6 hash partitions, and approximately 200 GB for eight hash partitions when computing local density. Additionally, the dynamic clustering system 112 used approximately ten minutes for two hash partitions, approximately fifteen minutes for four hash partitions, approximately twenty-one minutes for six hash partitions, and approximately twenty-six minutes for eight hash partitions when computing hash partitions.

Figure 11:
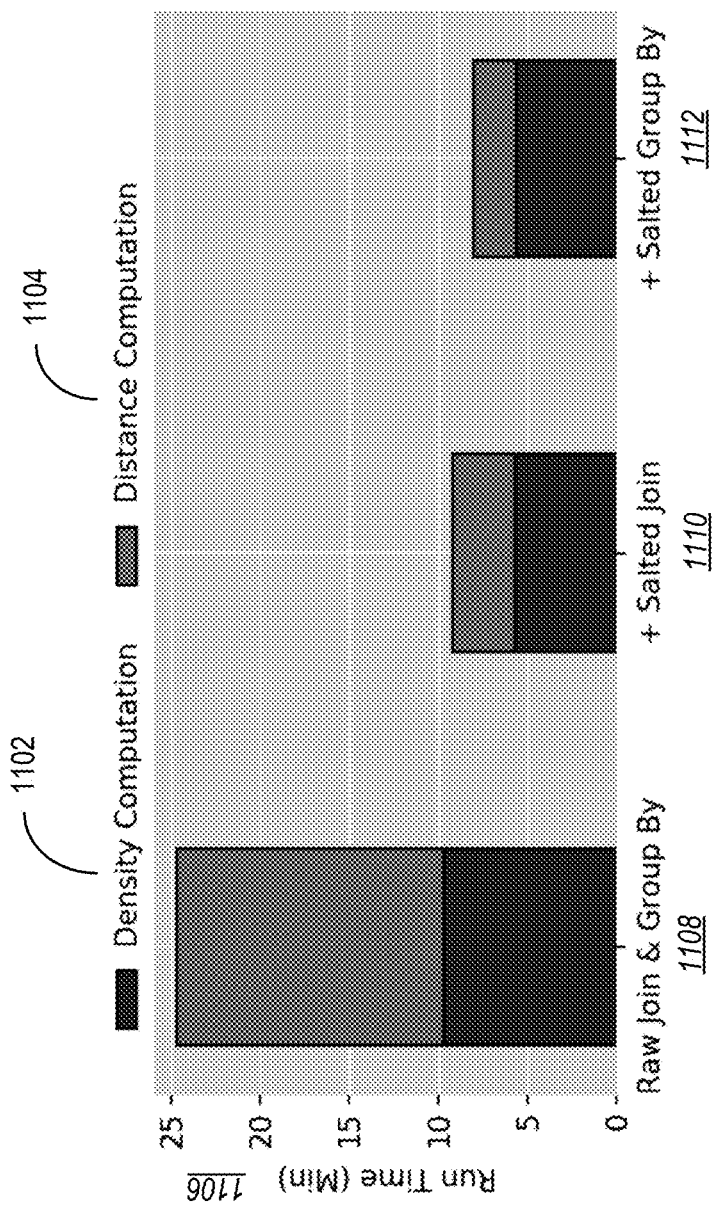
FIG. 11 illustrates a graph depicting the effect of the dynamic clustering system using salting techniques on the efficiency of clustering a dataset into segments in accordance with one or more embodiments.

FIG. 11 illustrates a bar graph reflecting the efficiency improvements of salting techniques for the dynamic clustering system 112 when determining local density and separation distance. More specifically, the bar graph in FIG. 11 illustrates the cumulative runtime of a density computation 1102 and a distance computation 1104 for a sparse dataset including data for 1.4 million users utilizing three different techniques. As shown in FIG. 11, the y-axis 1106 illustrates the runtime in minutes for both the density computation 1102 and the distance computation 1104.

In general, FIG. 11 illustrates that salting implementations scale well and remove approximately 60% of the time needed for the density computation 1102 and the distance computation 1104. As shown in FIG. 11, the dynamic clustering system 112 takes approximately 25 minutes to perform raw join and group-by operations 1108 without salting techniques. As further shown in the same bar of FIG. 11, the density computation 1102 takes approximately 10 minutes, while the distance computation takes approximately 15 minutes when using the raw join and group-by operations 1108 without salting techniques.

As discussed above with regard to FIG. 7A, in one or more embodiments, the dynamic clustering system 112 utilizes a join salting technique. FIG. 11 illustrates the significant reduction in runtime gained by utilizing a salted join technique 1110. The total runtime utilizing the salted join technique 1110 is nine minutes. That is, utilizing the salted join technique 1110, the dynamic clustering system 112 reduces the density computation 1102 to approximately six minutes, and the distance computation 1104 is reduced to approximately three minutes.

Further, as discussed above with regard to FIG. 7B, the dynamic clustering system 112 can utilize a grouping salting technique 1112. This grouping salting technique 1112 also grants a significant reduction in runtime, requiring only eight minutes total. More specifically, the dynamic clustering system 112 reduces the density computation 1102 to approximately six minutes and the distance computation 1104 to approximately two minutes. The dynamic clustering system 112 greatly improves efficiency by utilizing these salting techniques.

Figures 12A, 12B:
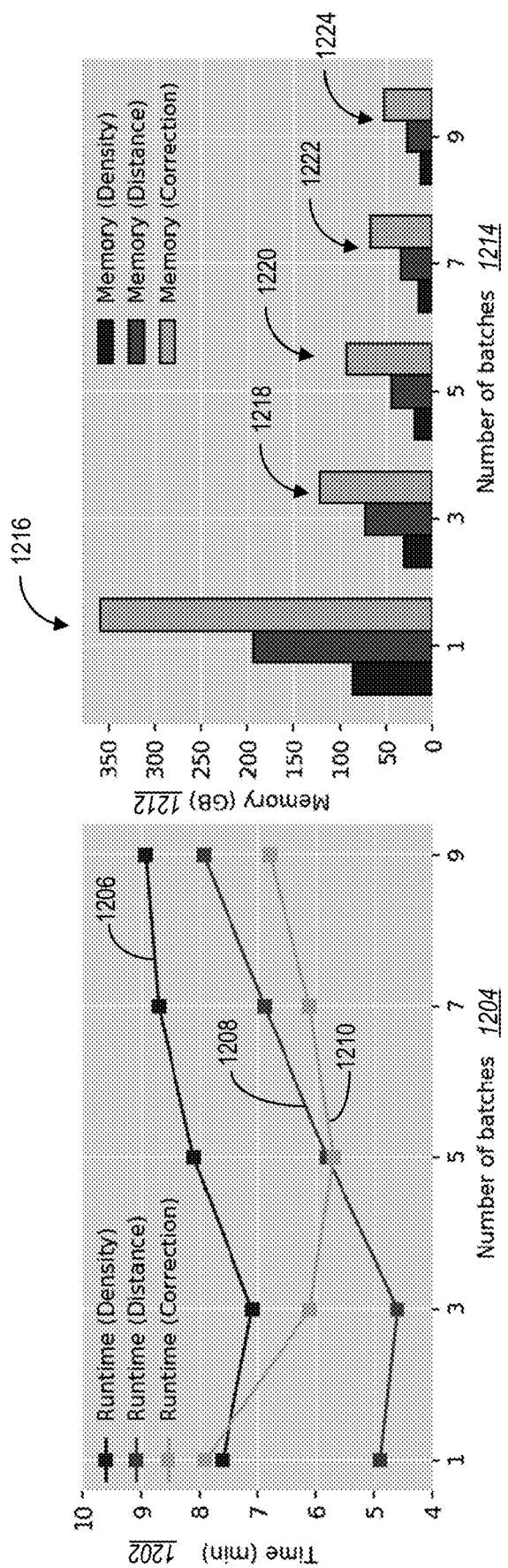
FIGS. 12A-12B illustrate graphs depicting the effect of the dynamic clustering system using batch processing on memory and run time in accordance with one or more embodiments.

FIGS. 12A-12B illustrate the effect of batch processing on memory and time consumption for the dynamic clustering system 112 in accordance with one or more embodiments. More specifically, FIGS. 12A-12B illustrate the results for run time and memory usage for the dynamic clustering system 112 during computation of distance, computation of density, and computation of correction for false negatives and false positives with respect to a sparse dataset including three million users. Overall, splitting the data into more batches dramatically reduces the memory utilized, but slightly increases run time due to an increased number of shuffle steps.

As shown in FIG. 12A, the runtime in minutes shown along a time axis 1202 reduces slightly over the number of batches shown along a batches axis 1204 from one batch to three batches for each of density, distance, and correction computations shown by a density plot 1206, a distance plot 1208, and a correction plot 1210. As indicated by the density plot 1206 and the distance plot 1208, the run time for density and distance computations increases slightly for batches 1204 from three batches to nine batches. As indicated by the correction plot 1210, run time for the correction computation continues to decrease slightly from three batches to five batches, and increases slightly from five batches to nine batches. As further shown by each of the density plot 1206, the distance plot 1208, and the correction plot 1210, the change in run time from one to nine batches is less than three minutes. Additionally, each plot shows an improvement in run time over not using batches at all.

FIG. 12B illustrates the improvements memory usage in terms of Giga Bytes along a memory axis 1212 for the dynamic clustering system 112 over the different numbers of batches along a batches axis 1214 for memory, distance, and correction computations. As shown in FIG. 12B, for one batch 1216, memory usage is significantly higher than for any of the other numbers of batches. Indeed, moving to three batches 1218, the memory usage is approximately one-third of that utilized in the one batch 1216. Though subsequent changes are less dramatic, at five batches 1220, seven batches 1222, and nine batches 1224, each show a decrease in memory usage for density, distance, and correction computations.

Accordingly, the dynamic clustering system 112 can reduce both run time and memory usage by utilizing one to three batches during batch processing. Additionally, the dynamic clustering system 112 can further reduce memory usage by utilizing more than three batches, while incurring only modest increase in run time. Thus, the dynamic clustering system 112 can utilize batch processing to improve efficiency and improve computing function.

Figure 13:
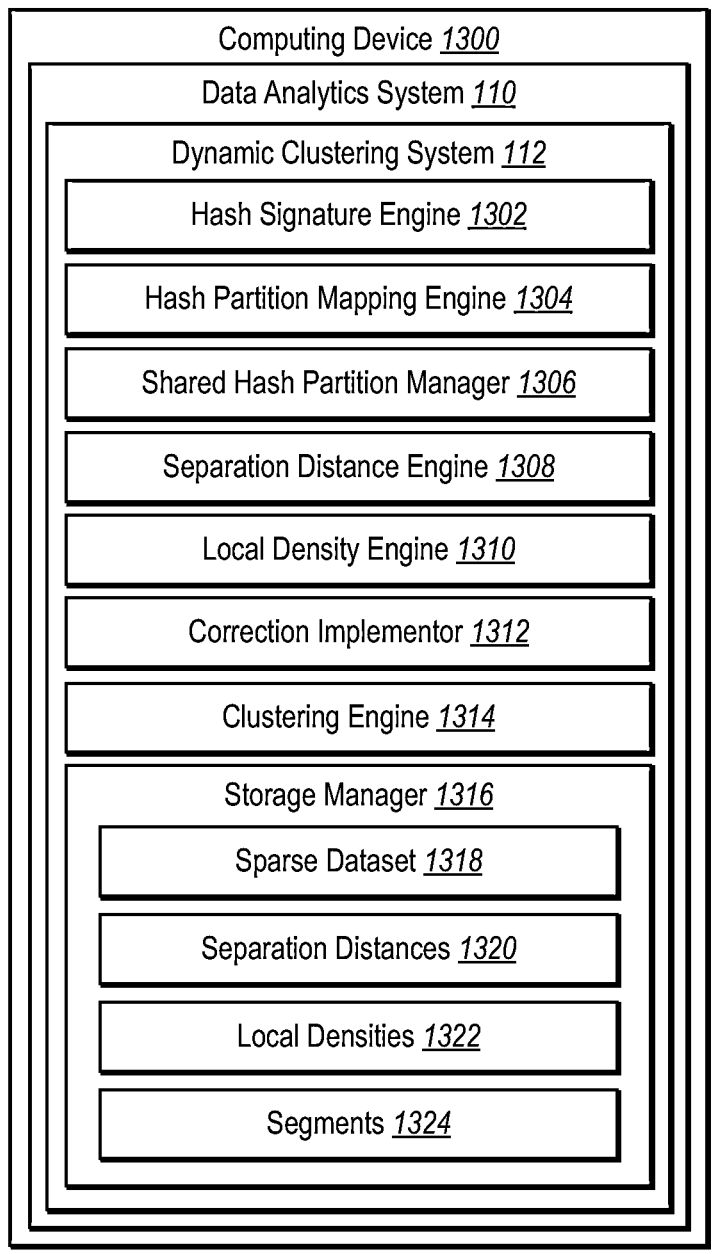
FIG. 13 illustrates an example schematic diagram of a dynamic clustering system in accordance with one or more embodiments.

Turning now to FIG. 13, this figure provides additional detail regarding components and features of a contextual translation system. In particular, FIG. 13 illustrates a computing device 1300 implementing the data analytics system and the dynamic clustering system 112. The computing device 1300 can include one or more servers (e.g., the server device(s) 108) and/or one or more client devices (e.g., the client device 102a-102n, the administrator device 104). As shown in FIG. 13, the computing device 1300 includes a hash signature engine 1302, a hash partition mapping engine 1304, a shared hash partition manager 1306, a separation distance engine 1308, a local density engine 1310, a correction implementor 1312, a segment-determining engine 1314, and a storage manager 1316. The following paragraphs describe each of these components.

As just mentioned, the computing device 1300 includes the hash signature engine 1302. The hash value engine 1302 generates hash signatures including various hash values for users and/or multi-dimensional data points from a sparse dataset. The hash signature engine 1302 can utilize a Min-Hash algorithm to generate the hash signatures and hash values.

Also, as shown in FIG. 13, the computing device 1300 includes the hash partition mapping engine 1304. The hash partition mapping engine 1304 can map users and/or multi-dimensional data points to hash partitions based on corresponding hash signatures. The hash partition mapping engine 1304 can map a user to a hash partition for each hash value in a hash signature. In one or more embodiments, shared hash partitions between users represent approximate similarities among the set of users.

Further, as shown in FIG. 13, the computing device 1300 includes the shared hash partition manager 1306. The dynamic clustering system 112 can track and identify shared hash partitions between users and/or multi-dimensional data points from sparse datasets. In one or more embodiments, the shared hash partition manager 1306 utilizes hash partition identifiers to determine shared hash partitions. The shared hash partition manager 1306 can identify users for consideration with regard to separation distance and local density determinations based on shared hash partitions.

As also shown in FIG. 13, the computing device 1300 includes the separation distance engine 1308. The separation distance engine 1308 can determine separation distances between users and/or multi-dimensional data points from sparse datasets. Further, the separation distance engine 1308 can determine nearest local users of higher densities for users and/or multi-dimensional data points. The separation distance engine 1308 can, in communication with the shared hash partition manager, consider users sharing at least one hash partition as candidates for the nearest local user of higher density. Thus, the separation distance engine 1308 can determine the local densities within the hash partitions.

Additionally, as shown in FIG. 13, the computing device 1300 includes the local density engine 1310. The local density engine 1310 can determine local densities for users and/or multi-dimensional data points from sparse datasets. The local density engine 1310 can, in communication with the shared hash partition manager, consider users sharing a threshold number of hash partitions when determining local densities. Thus, the local density engine 1310 can determine the local densities within the hash partitions.

As shown in FIG. 13, the computing device 1300 includes the correction implementor 1312. The correction implementor 1312 can implement corrections to local densities and/or to nearest local users of higher density. For example, the correction implementor 1312 can implement a correction to remove false positives from local density by filtering out users having a separation distance form a queried user not satisfying a separation-distance threshold. Additionally, the correction implementor 1312 can correct for false negatives in a local density determination based on a retrieval probability. Further, the correction implementor 1312 can correct for false negatives when determining a nearest local user of higher density based on a non-collision probability.

As shown in FIG. 13, the computing device 1300 includes the segment-determining engine 1314. The segment-determining engine 1314 can identify segments of users and/or segments of multi-dimensional data points. The segment-determining engine 1314 can utilize a sparse-density-peaks-clustering algorithm to determine user segments. Further, the sparse-density-peaks-clustering algorithm can determine updated user segments based on an updated sparse dataset including a data-updated set of users.

As shown in FIG. 13, the computing device 1300 includes the storage manager 1316. The storage manager 1310 stores and accesses files, indicators, and other data for the dynamic clustering system 112 and/or for the data analytics system 110. For example, the storage manager 1316 can communicate with any of the components of the computing device 1300 in order to store a variety of data types for the dynamic clustering system 112. Further, as shown in FIG. 13, the storage manager 1316 includes sparse datasets 1318, separation distances 1320, local densities 1322, and segments 1324.

As discussed above, the dynamic clustering system 112 may be implemented in conjunction with an application, including but not limited to ADOBE® ANALYTICS CLOUD, such as ADOBE® ANALYTICS, ADOBE® AUDIENCE MANAGER, ADOBE® CAMPAIGN, and ADOBE® TARGET. "ADOBE," "ADOBE ANALYTICS CLOUD," "ADOBE ANALYTICS," "ADOBE AUDIENCE MANAGER," "ADOBE CAMPAIGN," and "ADOBE TARGET" are either registered trademarks or trademarks of Adobe Inc. in the United States and/or other countries.

Figure 14:
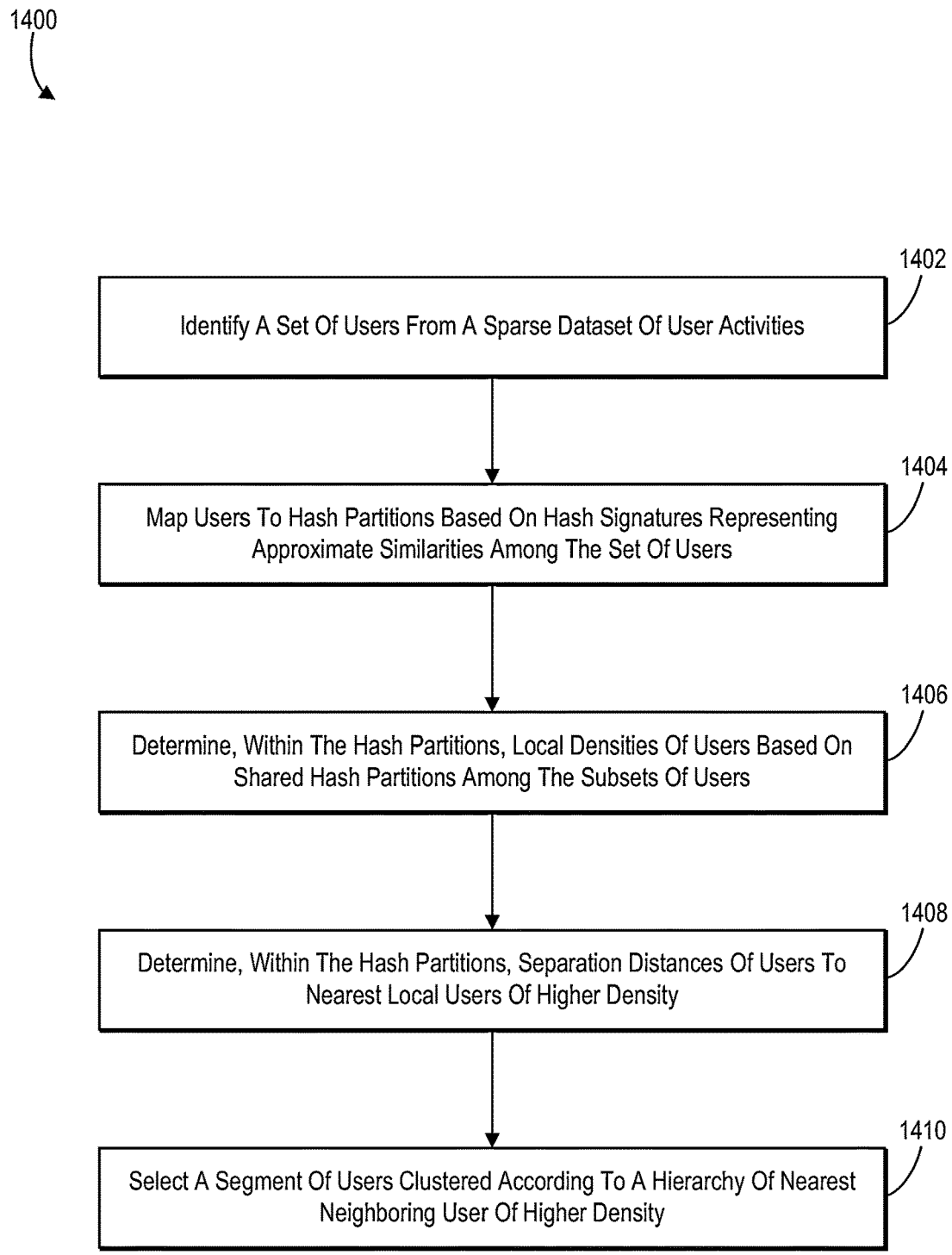
FIG. 14 illustrates a flowchart of a series of acts for utilizing hash partitions to determine local densities and separation distances for data clustering in accordance with one or more embodiments.

FIGS. 1-13, the corresponding text, and the examples provide a number of different methods, systems, devices, and non-transitory computer-readable media of the dynamic clustering system 112. In addition to the foregoing, one or more embodiments can also be described in terms of flowcharts comprising acts for accomplishing a particular result, as shown in FIG. 14. FIG. 14 may be performed with more or fewer acts. Further, the acts may be performed in differing orders. Additionally, the acts described herein may be repeated or performed in parallel with one another or parallel with different instances of the same or similar acts.

As mentioned, FIG. 14 illustrates a flowchart of a series of acts 1400 for clustering a sparse dataset in accordance with one or more embodiments. While FIG. 14 illustrates acts 1402-1410 according to one embodiment, alternative embodiments may omit, add to, reorder, and/or modify any of the acts shown in FIG. 14. The acts of FIG. 14 can be performed as part of a method. Alternatively, a non-transitory computer-readable medium can comprise instructions that, when executed by one or more processors, cause a computing device to perform the acts of FIG. 14. In some embodiments, a system can perform the acts of FIG. 14.

As shown in FIG. 14, the series of acts 1400 includes an act 1402 for identifying a set of users from a sparse dataset of user activities. In particular, the act 1402 can include identifying a set of users corresponding to a sparse dataset of user activities.

As shown in FIG. 14, the series of acts 1400 includes an act 1404 for mapping users to hash partition based on hash signatures representing approximate similarities among the set of users. In particular, the act 1404 can include mapping subsets of users from the set of users to hash partitions based on hash signatures representing approximate similarities among the set of users. Specifically, the act 1404 can include mapping subsets of users from the set of users to hash partitions utilizing a hash function based on hash signatures representing approximate similarities among attribute values of the set of users.

Further, the act 1404 can include generating a hash signature for each user that approximates a similarity between attribute values corresponding to the user; and mapping the subsets of users from the sets of users to the hash partitions by utilizing a locality-sensitive-hashing to hash a set of similar users to a common hash partition. The act 1404 can also include generating a MinHash signature comprising a plurality of MinHash values for each user that approximates a similarity between attribute values corresponding to the user and mapping the subsets of users from the sets of users to the hash partitions by utilizing a locality-sensitive-hashing to hash a set of similar users to a common hash partition.

As shown in FIG. 14, the series of acts 1400 includes an act 1406 for determining, within the hash partitions, local densities of users based on shared hash partitions among the subsets of users. In particular, the act 1406 can include determining, within the hash partitions, local densities of users neighboring particular users from the subsets of users based on shared hash partitions among the subsets of users. Specifically, the act 1406 can include determining, within the hash partitions, local densities of users neighboring particular users from the subsets of users by generating a probability distribution of users sharing hash partitions.

Further, the act 1406 can include determining a number of users sharing a threshold number of hash partitions with the queried user, determining a separation distance between the queried user and each user sharing the threshold number of hash partitions with the queried user, and identifying neighboring users having individual separation distances from the queried user satisfying a separation-distance threshold. The act 1406 can also include determining a number of multi-dimensional data points corresponding to users sharing a threshold number of hash partitions with a queried multi-dimensional data point corresponding to the queried user, determining a separation distance between the queried multi-dimensional data point and each multi-dimensional data point sharing the threshold number of hash partitions with the queried multi-dimensional data point, and identifying multi-dimensional neighboring data points having individual separation distances from the quired multi-dimensional data point satisfying a separation-distance threshold.

Additionally, the act 1406 can include determining a retrieval probability of retrieving a neighboring user within the separation-distance threshold from the queried user, determining a total number of neighboring users having particular approximate similarities and sharing the threshold number of hash partitions with the queried user, and determining the local density of the queried user based on the total number of neighboring users having the particular approximate similarities and the retrieval probability. Further, the act 1406 can include determining a retrieval probability of retrieving a neighboring multi-dimensional data point within the separation-distance threshold from the queried multi-dimensional data point, determining a total number of neighboring multi-dimensional data points having particular approximate similarities and sharing the threshold number of hash partitions with the queried multi-dimensional data point, and determining the local density of the queried multi-dimensional data point based on the total number of neighboring multi-dimensional data points having the particular approximate similarities and the retrieval probability. The act 1406 can also include generating a probability distribution of users sharing hash partitions with the queried user.

As shown in FIG. 14, the series of acts 1400 includes an act 1408 for determining, within the hash partitions, separation distances of users to nearest local users of higher densities. In particular, the act 1408 can include determining, within the hash partitions, separation distances of the particular users from the subsets of users to nearest local users of higher density. Specifically, the act 1408 can include determining, within the hash partitions, separation distances for the particular users from the subsets of users to nearest local users of higher density by ordering local users of higher density than the particular users within the hash partitions according to separation distance.

The act 1408 can also include determining a separation distance between the queried user and each user sharing a hash partition with the queried user and identifying the nearest local user of higher density corresponding to the queried user from among users sharing the hash partition with the queried user based on determined separation distances. Additionally, the act 1408 can include determining a separation distance between the queried multi-dimensional data point and each multi-dimensional data point sharing a hash partition with the queried multi-dimensional data point, and identifying the nearest local multi-dimensional data point of higher density corresponding to the queried multi-dimensional data point from among multi-dimensional data points sharing the hash partition with the queried multi-dimensional data point based on determined separation distances.

Further, the act 1408 can include determining a non-collision probability that the nearest local user of higher density sharing the hash partition with the queried user is not an actual nearest user of higher density that does not share a hash partition with the queried user, based on determining that the non-collision probability does not satisfy a probability threshold, comparing the queried user to a high-density set of users of highest local density, and selecting a corrected nearest user of higher density for the queried user from among the high-density set of users of highest local density. The act 1408 can also include determining a non-collision probability that the nearest local multi-dimensional data point of higher density sharing the hash partition with the queried multi-dimensional data point is not an actual nearest multi-dimensional data point of higher density that does not share a hash partition with the queried multi-dimensional data point, based on determining that the non-collision probability does not satisfy a probability threshold, comparing the queried multi-dimensional data point to a high-density set of multi-dimensional data points of highest local density, and selecting a corrected nearest multi-dimensional data point for the queried multi-dimensional data point from among the high-density set of multi-dimensional data points of highest local density.

Additionally, the act 1408 can include determining the local densities of users neighboring the particular users by joining users into user pairings according to shared hash values, filtering ineligible user pairings from the user pairings based on identifying duplicate-user pairings and a separation-distance threshold, and grouping eligible user pairings from the user pairings according to user identifiers and a count operation. The act 1408 can also include determining the separation distances of the particular users to the nearest local users of higher density by joining users into user pairings according to shared hash values and local-density quantiles, filtering ineligible user pairings from the user pairings based on comparing local densities of the user pairings, and grouping eligible user pairings from the user pairings according to a minimum separation distance.

As shown in FIG. 14, the series of acts 1400 includes an act 1410 for, in response to receiving a request to segment the set of users, selecting a segment of users clustered according to a hierarchy of nearest neighboring user of higher density. In particular, the act 1410 can include, in response to receiving a request to segment the set of users, selecting from the set of users, for display on a client device, a segment of users representing users clustered according to a hierarchy of nearest neighboring user of higher density. Additionally, the act 1410 can include determining the hierarchy of nearest neighboring user of higher density utilizing a sparse-density-peaks-clustering algorithm.

Specifically, the act 1410 can include, in response to receiving a request to segment the set of users, selecting from the set of users, for display on a client device, a segment of users representing users clustered according to a hierarchy of nearest neighboring user of higher density utilizing a density-based-clustering algorithm. Further, the act 1410 can include, in response to receiving a selection of the segment of users, selecting from the segment of users, for display on a client device, a subsegment of users clustered according to a new hierarchy of nearest neighboring user of higher density.

The set of acts 1400 can also include identifying an updated sparse dataset of user activities from a new data batch corresponding to the set of users, separating a data-updated set of users corresponding to the updated sparse dataset into disjointed subsets of users, determining an updated local density of users neighboring a data-updated user based on shared hash partitions among the disjointed subset of users, determining an updated separation distance of the data-updated user to a nearest local user of higher density of the disjointed subset of users, and in response to receiving a new request to segment the set of users, selecting from the set of users, for display on the client device, a new segment of users comprising the data-updated user and representing users clustered according to an updated hierarchy of nearest neighboring user of higher density.

In addition (or in the alternative) to the acts describe above, in some embodiments, the acts 1100 include a step for locating, within the hash partitions, nearest neighboring users of higher densities for particular users from the subsets of users. For instance, the algorithms and acts described in reference to FIGS. 4A and 4B can comprise the corresponding acts for performing a step for locating, within the hash partitions, nearest neighboring users of higher densities for particular users from the subsets of users.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

FIG. 15 illustrates a block diagram of example computing device 1500 that may be configured to perform one or more of the processes described above. As shown by FIG. 15, the computing device 1500 can comprise a processor 1502, a memory 1504, a storage device 1506, an I/O interface 1508, and a communication interface 1510, which may be communicatively coupled by way of a communication infrastructure 1512. In certain embodiments, the computing device 1500 can include fewer or more components than those shown in FIG. 15. Components of the computing device 1500 shown in FIG. 15 will now be described in additional detail.

In one or more embodiments, the processor 1502 includes hardware for executing instructions, such as those making up a computer program. As an example, and not by way of limitation, to execute instructions for digitizing real-world objects, the processor 1502 may retrieve (or fetch) the instructions from an internal register, an internal cache, the memory 1504, or the storage device 1506 and decode and execute them. The memory 1504 may be a volatile or non-volatile memory used for storing data, metadata, and programs for execution by the processor(s). The storage device 1506 includes storage, such as a hard disk, flash disk drive, or other digital storage device, for storing data or instructions related to object digitizing processes (e.g., digital scans, digital models).

The I/O interface 1508 allows a user to provide input to, receive output from, and otherwise transfer data to and receive data from computing device 1500. The I/O interface 1508 may include a mouse, a keypad or a keyboard, a touch screen, a camera, an optical scanner, network interface, modem, other known I/O devices or a combination of such I/O interfaces. The I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1508 is configured to provide graphical data to a display for presentation to a user. The graphical data may be representative of one or more graphical user interfaces and/or any other graphical content as may serve a particular implementation.

The communication interface 1510 can include hardware, software, or both. In any event, the communication interface 1510 can provide one or more interfaces for communication (such as, for example, packet-based communication) between the computing device 1500 and one or more other computing devices or networks. As an example and not by way of limitation, the communication interface 1510 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1510 may facilitate communications with various types of wired or wireless networks. The communication interface 1510 may also facilitate communications using various communication protocols. The communication infrastructure 1512 may also include hardware, software, or both that couples components of the computing device 1500 to each other. For example, the communication interface 1510 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by a processing device, cause the processing device to perform operations comprising:
    accessing a sparse dataset;
    generating hash signatures for users utilizing associated data points from the sparse dataset;
    mapping the users to hash partitions based on the hash signatures;
    determining local densities and separation distances for the users based on the hash partitions; and
    segmenting the users into clusters based on the local densities and separation distances.

2. The non-transitory computer readable medium of claim 1, wherein determining local densities for the users based on the hash partitions comprises generating a probability distribution of users sharing hash partitions.

3. The non-transitory computer readable medium of claim 1, wherein determining separation distances for the users based on the hash partitions comprises limiting determinations of separation distance to users with at least one shared hash partition.

4. The non-transitory computer readable medium of claim 1, wherein segmenting the users into clusters based on the local densities and separation distances comprises clustering each point of the associated data points to a same segment as its nearest neighbor in descending order of density.

5. The non-transitory computer readable medium of claim 1, wherein determining separation distances for the users based on the hash partitions comprises determining a minimum distance between a given user and another user having a higher density.

6. The non-transitory computer readable medium of claim 1, wherein generating hash signatures for users utilizing associated data points from the sparse dataset comprises generating a set of hash values for each user utilizing a MinHash algorithm.

7. The non-transitory computer readable medium of claim 1, wherein determining local densities for the users based on the hash partitions comprises determining a count of users surrounding a given user that have a threshold number of shared hash partitions with the given user.

8. The non-transitory computer readable medium of claim 1, wherein determining local densities for the users based on the hash partitions comprises utilizing join, filter, and group-by operations.

9. A method comprising:
    accessing a sparse dataset;
    generating hash signatures for users utilizing associated data points from the sparse dataset;
    mapping the users to hash partitions based on the hash signatures;
    determining local densities and separation distances for the users based on the hash partitions; and
    segmenting the users into clusters based on the local densities and separation distances.

10. The method of claim 9, wherein determining local densities and separation distances for the users based on the hash partitions comprises:
    determining a number of users sharing a threshold number of hash partitions with a queried user;
    determining a separation distance between the queried user and each user sharing the threshold number of hash partitions with the queried user; and
    identifying neighboring users having individual separation distances from the queried user satisfying a separation-distance threshold.

11. The method of claim 10, wherein determining local densities and separation distances for the users based on the hash partitions further comprises:
    determining a retrieval probability of retrieving a neighboring user within the separation-distance threshold from the queried user;
    determining a total number of neighboring users having particular approximate similarities and sharing the threshold number of hash partitions with the queried user; and
    determining a local density of the queried user based on the total number of neighboring users having the particular approximate similarities and the retrieval probability.

12. The method of claim 10, wherein determining local densities and separation distances for the users based on the hash partitions further comprises:
    determining a separation distance between the queried user and each user sharing a hash partition with the queried user; and
    identifying a nearest local user of higher density corresponding to the queried user from among users sharing the hash partition with the queried user based on separation distances between the queried user and each user sharing a hash partition with the queried user.

13. The method of claim 12, wherein identifying the nearest local user of higher density corresponding to the queried user comprises:
    determining a non-collision probability that the nearest local user of higher density sharing the hash partition with the queried user is not an actual nearest user of higher density that does not share a hash partition with the queried user;

based on determining that the non-collision probability does not satisfy a probability threshold, comparing the queried user to a high-density set of users of highest local density; and selecting a different user as a corrected nearest user of higher density for the queried user from among the high-density set of users of highest local density in place of the nearest local user of higher density based on the different user having a separation distance smaller than that of the nearest local user of higher density.

14. The method of claim 9, wherein determining local densities and separation distances for the users based on the hash partitions further comprises:

joining users into user pairings according to shared hash values;

filtering ineligible user pairings from the user pairings based on identifying duplicate-user pairings and a separation-distance threshold; and grouping eligible user pairings from the user pairings according to user identifiers and a count operation.

15. The method of claim 9, wherein determining local densities and separation distances for the users based on the hash partitions further comprises:

joining users into user pairings according to shared hash values and local-density quantiles the local-density quantiles comprising a set of local densities divided by a frequency distribution into equal groups based on a randomized variable;

filtering ineligible user pairings from the user pairings based on comparing local densities of the user pairings; and grouping eligible user pairings from the user pairings according to a minimum separation distance.

16. A system comprising:

a memory component comprising a sparse dataset corresponding to activities of users; and a processing device coupled to the memory component, the processing device performs operations comprising:

accessing the sparse dataset;

generating hash signatures for the users utilizing associated data points from the sparse dataset;

mapping the users to hash partitions based on the hash signatures;

determining local densities for the users based on the hash partitions and separation distances for the users based on the hash partitions; and segmenting the users into clusters based on the local densities and separation distances.

17. The system of claim 16, wherein:

generating hash signatures for users utilizing associated data points from the sparse dataset comprises generating a hash signature for each user that approximates a similarity between attribute values corresponding to the user; and mapping the users to hash partitions based on the hash signatures comprises utilizing a locality-sensitive-hashing to hash a set of similar users to a common hash partition.

18. The system of claim 16, wherein the operations further comprise in response to receiving a selection of a cluster of users:

selecting and displaying from the cluster of users a first subsegment of users and a second subsegment of users clustered according to a new hierarchy of nearest neighboring user of higher density.

19. The system of claim 16, wherein the operations further comprise:

distributing the hash partitions among nodes of a distributed database;

wherein determining local densities for the users based on the hash partitions by joining, filtering, and grouping of the nodes of the distributed database utilizing parallel processing of a plurality of join, filter, and group-by pipelines.

20. The system of claim 19, wherein the operations further comprise redistributing the hash partitions among nodes of the distributed database during joining or grouping utilizing a salted key by modifying a join key to redistribute data in an even manner so that parallel joining and grouping processes take approximately a same amount of time.

\* \* \* \* \*